US006949856B2

(12) United States Patent
Tajima et al.

(10) Patent No.: US 6,949,856 B2
(45) Date of Patent: Sep. 27, 2005

(54) PERMANENT MAGNET ROTATING ELECTRIC MACHINE AND ELECTRICALLY DRIVEN VEHICLE EMPLOYING SAME

(75) Inventors: Fumio Tajima, Taga-gun (JP); Yutaka Matsunobe, Hitachi (JP); Shouichi Kawamata, Hitachi (JP); Suetaro Shibukawa, Hitachinaka (JP); Osamu Koizumi, Higashi-ibaraki-gun (JP); Keiji Oda, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 10/800,752

(22) Filed: Mar. 16, 2004

(65) Prior Publication Data

US 2004/0174084 A1 Sep. 9, 2004

Related U.S. Application Data

(63) Continuation of application No. 10/142,154, filed on May 10, 2002, now Pat. No. 6,734,592, which is a continuation of application No. 10/142,220, filed on May 10, 2002, now abandoned, which is a continuation of application No. 09/488,637, filed on Jan. 21, 2000, now Pat. No. 6,396,183, which is a continuation of application No. 08/838,745, filed on Apr. 11, 1997, now Pat. No. 6,034,460.

(30) Foreign Application Priority Data

Apr. 12, 1996 (JP) .............................................. 8-091014

(51) Int. Cl.$^7$ .............................................. H02K 21/12
(52) U.S. Cl. .............................. 310/156.53; 310/156.56
(58) Field of Search ...................... 310/156.53, 156.56, 310/216, 68 B, 261

(56) References Cited

U.S. PATENT DOCUMENTS

| | | | | | |
|---|---|---|---|---|---|
| 4,651,066 A | * | 3/1987 | Gritter et al. | ............... | 310/156 |
| 4,700,098 A | * | 10/1987 | Kawashima | ................ | 310/186 |
| 4,774,428 A | * | 9/1988 | Konecny | .................... | 310/198 |
| 4,924,125 A | * | 5/1990 | Clark | ........................ | 310/67 R |
| 5,304,882 A | * | 4/1994 | Lipo et al. | .................. | 310/156 |
| 5,508,576 A | * | 4/1996 | Nagate et al. | ......... | 310/156.54 |
| 5,663,605 A | * | 9/1997 | Evans et al. | ................ | 310/181 |
| 5,844,344 A | * | 12/1998 | Uetake et al. | ......... | 310/156.49 |
| 6,049,153 A | * | 4/2000 | Nishiyama et al. | ......... | 310/156 |

FOREIGN PATENT DOCUMENTS

| | | | | |
|---|---|---|---|---|
| JP | 62-110468 | | 5/1987 | |
| JP | 04322152 | | 11/1992 | |
| JP | 5-76146 | * | 3/1993 | ............ 310/156.53 |
| JP | 05252706 | | 9/1993 | |
| JP | 6-209534 | | 7/1994 | |
| JP | 7-39091 | | 2/1995 | |
| JP | 7-222422 | | 8/1995 | |
| JP | 8-66082 | | 3/1996 | |
| JP | 8-331784 | | 12/1996 | |
| JP | 5-219669 | | 8/1998 | |
| JP | 7-255138 | | 10/1998 | |
| WO | WO97/31422 | | 8/1997 | |

* cited by examiner

Primary Examiner—Tran Nguyen
(74) Attorney, Agent, or Firm—Crowell & Moring LLP

(57) ABSTRACT

A rotating electric machine comprises a stator having stator salient poles, three-phases windings wound around said stator salient poles, a rotor rotatable held inside the said stator, and permanent magnets inserted into said rotor and positioned opposite to said stator salient poles, wherein said three-phase windings are concentratively wound around each of said stator salient poles, said windings of each phase are wound around at more than one stator salient p9ole, and said windings of each phase have a phase difference of voltage between at least one of the windings and the other.

38 Claims, 9 Drawing Sheets

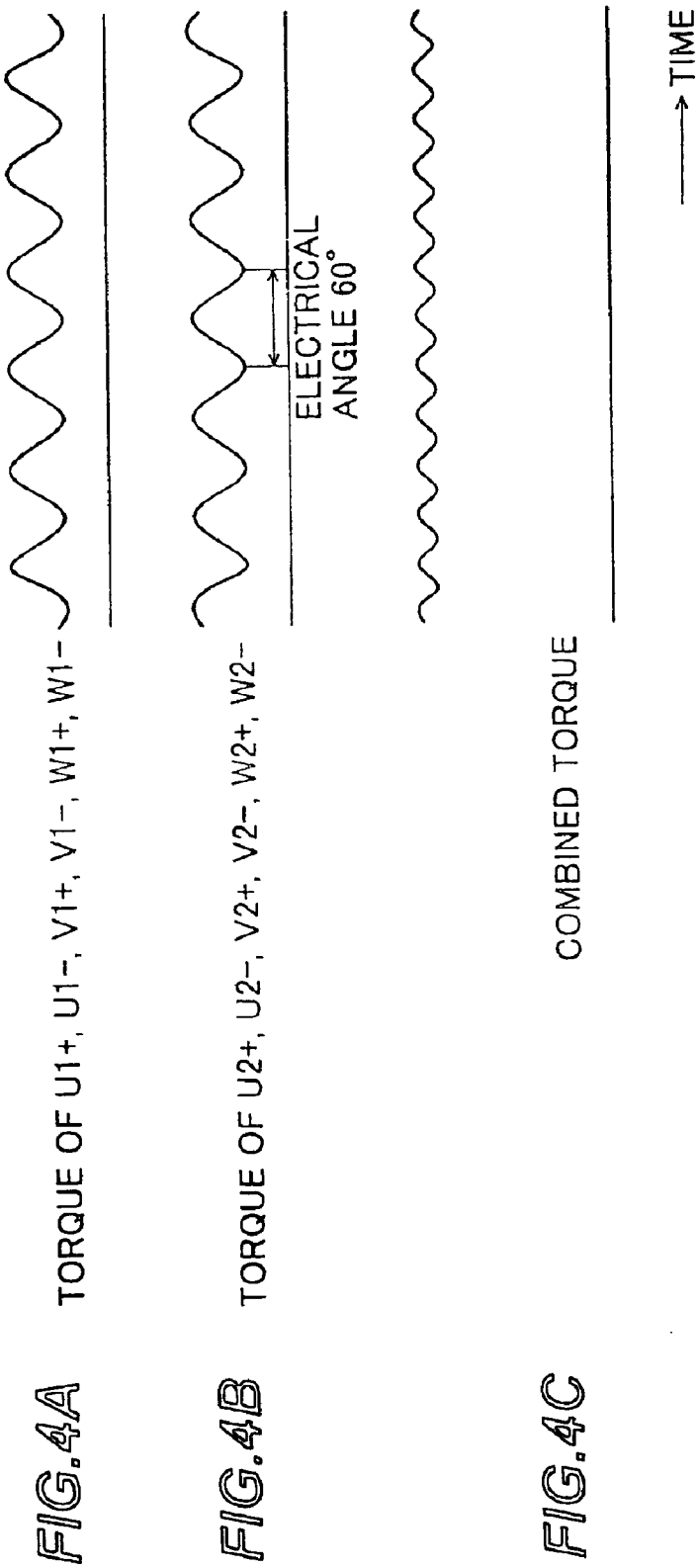

PERMANENT MAGNET ROTATING ELECTRIC MACHINE AND ELECTRICALLY DRIVEN VEHICLE EMPLOYING SAME

BACKGROUND OF THE INVENTION

1. Field of the Invention

The present invention relates generally to a permanent magnet rotating electric machine and an electrically driven vehicle employing same.

2. Description of Related Art

Motors used in electrically driven vehicles, in particular, driving electric cars must ensure a sufficient running distance with a limited battery capacity, so that they are desired to be small, light-weight, and highly efficient.

For a motor to be small and light weight, it is required to be suitable for high speed rotation. In this regard, permanent magnet motors are advantageous over direct-current motors and induction motor.

Permanent magnet rotors are classified into a surface magnet rotor which has permanent magnets positioned along the outer periphery of the rotor and a so-called internal magnet rotor which has a permanent magnet holder within a core made of silicon steel or the like having a higher magnetic permeability than permanent magnets.

The surface magnet rotor is advantageous in ease of control, less influences by reactive magnetic flux of a stator winding, low noise, and so on. However, the surface magnet rotor also has several disadvantages such as requirement of reinforced magnets for high speed rotation, a narrow speed control range due to difficulties in field weakening control, a low efficiency in high speed and low load operations, and so on.

The internal magnet rotor, in turn, has advantages such as the capability of high speed rotation by field weakening control using magnetic pole pieces positioned along the outer periphery of magnets, the capability of highly efficient rotation in high speed and low load operations, utilization of reluctance torque, and so on.

Prior art internal magnet rotors are described, for example, in JP-A-5-219669, FIG. 5 of JP-A-7-39091.

Within large-size permanent magnet motors used in electric vehicles and so on, those having an internal permanent magnet rotor employ a distributed winding stator for their stator structure.

However, permanent magnet motors described in the prior art have a disadvantage that pulsating torque based on high frequency components of permanent magnets or auxiliary magnet poles is produced. Also, cogging torque is produced by influence of roughness and fineness of magnetic flux of stator salient poles and roughness and fineness of magnetic flux of permanent magnets, and smooth rotation of permanent magnet motors cannot be obtained. Further, since the distributed winding stator has elongated winding ends, this causes a limitation to reduction in size and weight of rotating electric machines employing a distributed winding stator.

SUMMARY OF THE INVENTION

It is an object of the present invention to provide a permanent magnet rotating electric machine which has small pulsating torque and cogging torque, and can be obtained smooth rotation thereof.

It is another object of the present invention to provide a permanent magnet rotating electric machine having shortened winding ends, and having stator construction being capable to be small, light-weight.

To achieve the above object, according to a first aspect, the present invention provides a permanent magnet rotating electric machine comprising a stator having stator salient poles, three-phases windings wound around said stator salient poles, a rotor rotatably held inside the said stator, and permanent magnets inserted into said rotor and positioned opposite to said stator salient poles, wherein said three-phase windings are concentratively wound around each of said stator salient poles, said windings of each phase are wound around at more than one stator salient pole, and said windings of each phase have a phase difference of voltage between at least one of the windings and the other.

Preferably, the permanent magnet rotating electric machine satisfies M:P=6n:6n+2, where M is the number of the stator salient poles, P is the number of the permanent magnets, and n is a positive integer.

Preferably, the permanent magnet rotating electric machine satisfies M:P=3n:3n±1, where M is the number of the stator salient poles, P is the number of the permanent magnets of the rotor, and n is a positive integer.

Preferably, in the permanent magnet rotating electric machine, the number of poles of the permanent magnets is eight or more.

Preferably, in the permanent magnet rotating electric machine, a magnetic pole piece area of the rotor is projected toward the stator.

Preferably, in the permanent magnet rotating electric machine, a magnetic material having a higher magnetic impermeability than the permanent magnets is disposed between adjacent ones of the permanent magnets.

To achieve the above object, according to a second aspect, the present invention provides a permanent magnet rotating electric machine comprising a stator having stator salient poles, three-phases windings wound around said stator salient poles, a rotor rotatable held inside the said stator, and permanent magnets inserted into said rotor and positioned opposite to said stator salient poles, wherein said three-phase windings are concentratively wound around each of said stator salient poles.

To achieve the above object, according to an aspect, the present invention provides an electrically driven vehicle comprising a permanent magnet rotating electric machine being coupled to drive wheels comprising a stator having stator salient poles, three-phases windings wound around said stator salient poles, a rotor rotatable held inside the said stator, and permanent magnets inserted into said rotor and positioned opposite to said stator salient poles, and control means for supplying a voltage to said three-phase windings, wherein said three-phase windings are concentratively wound around each of said stator salient poles, said windings of each phase are wound around at more than one stator salient pole, and said control means supplies voltage which has a phase difference between at least one of the windings and the other among each phase of three-phase.

BRIEF DESCRIPTION OF THE DRAWINGS

FIGS. 4A–4C are explanatory diagrams illustrating torque generated by the permanent magnet rotating electric machine according to the first embodiment of the present invention;

DESCRIPTION OF THE PREFERRED EMBODIMENTS

Permanent magnet rotating electric machines according to a first embodiment of the present invention will hereinafter be described with reference to FIGS. 1–5C.

Figure 1:
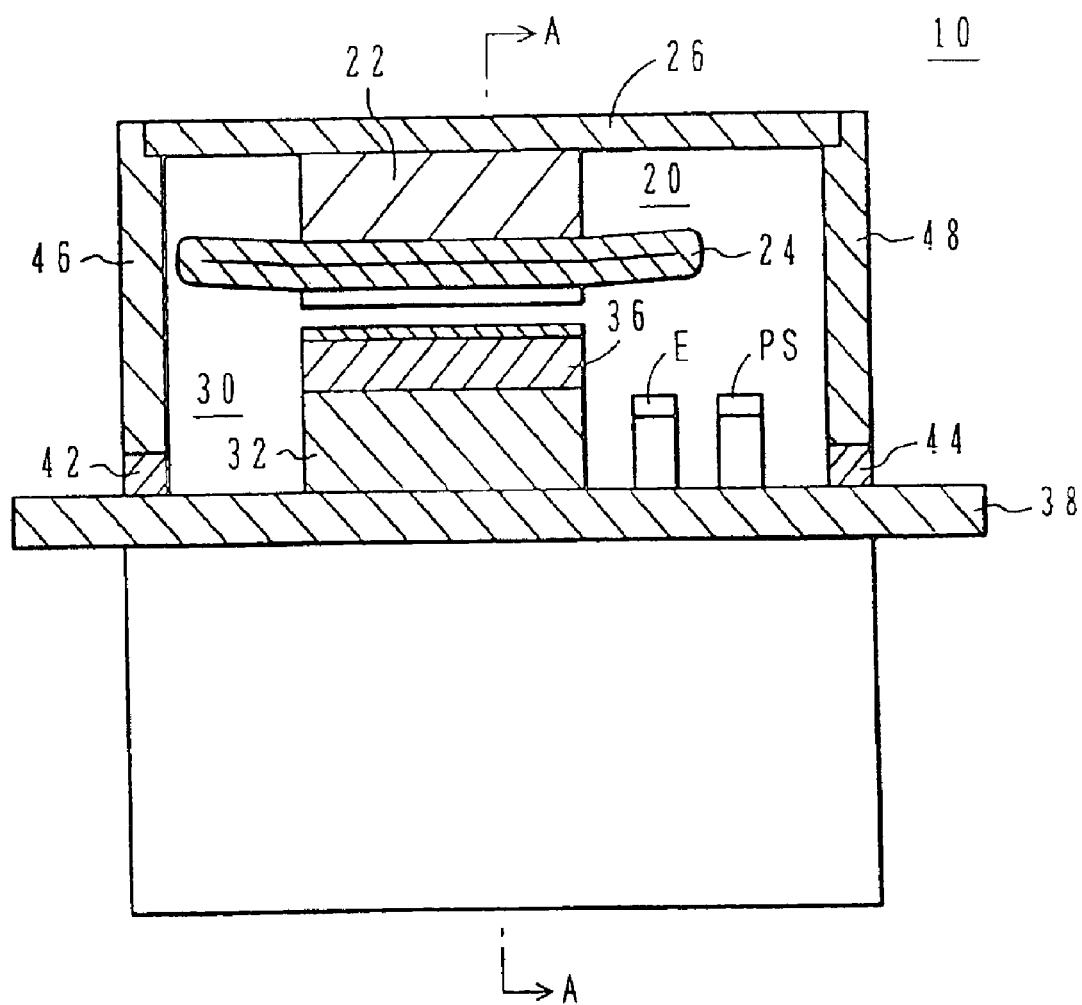
FIG. 1 is a partial cross-sectional view of a permanent magnet rotating electric machine according to a first embodiment of the present invention, viewed from the front side thereof.

FIG. 1 is a partial cross-sectional view of a permanent magnet rotating electric machine according to a first embodiment of the present invention, viewed from the front side thereof.

Referring specifically to FIG. 1, a stator 20 of a rotating electric machine 10 comprises a stator core 22, multi-phase stator windings 24 wound around the stator core 22, and a housing 26 for securely holding the stator core 22 on the inner peripheral surface thereof. A rotor 30 comprises a rotor core 32, permanent magnets 36 inserted into permanent magnet inserting holes 34 formed in the rotor core 32, and a shaft 38. The shaft 38 is rotatable held by bearings 42, 44. The bearings 42, 44 are supported by end brackets 46, 48, respectively, which in turn is secured to both ends of the housing 26.

A magnetic pole position detector PS for detecting the position of the permanent magnets 36 of the rotor 30 and an encoder E for detecting the position of the rotor 30 are disposed on a side surface of the rotor 30. The operation of the rotating electric machine 10 is controlled by a control unit, later described with reference to FIG. 3, in response to a signal of the magnetic pole position detector PS and an output signal of the encoder E.

Figure 2:
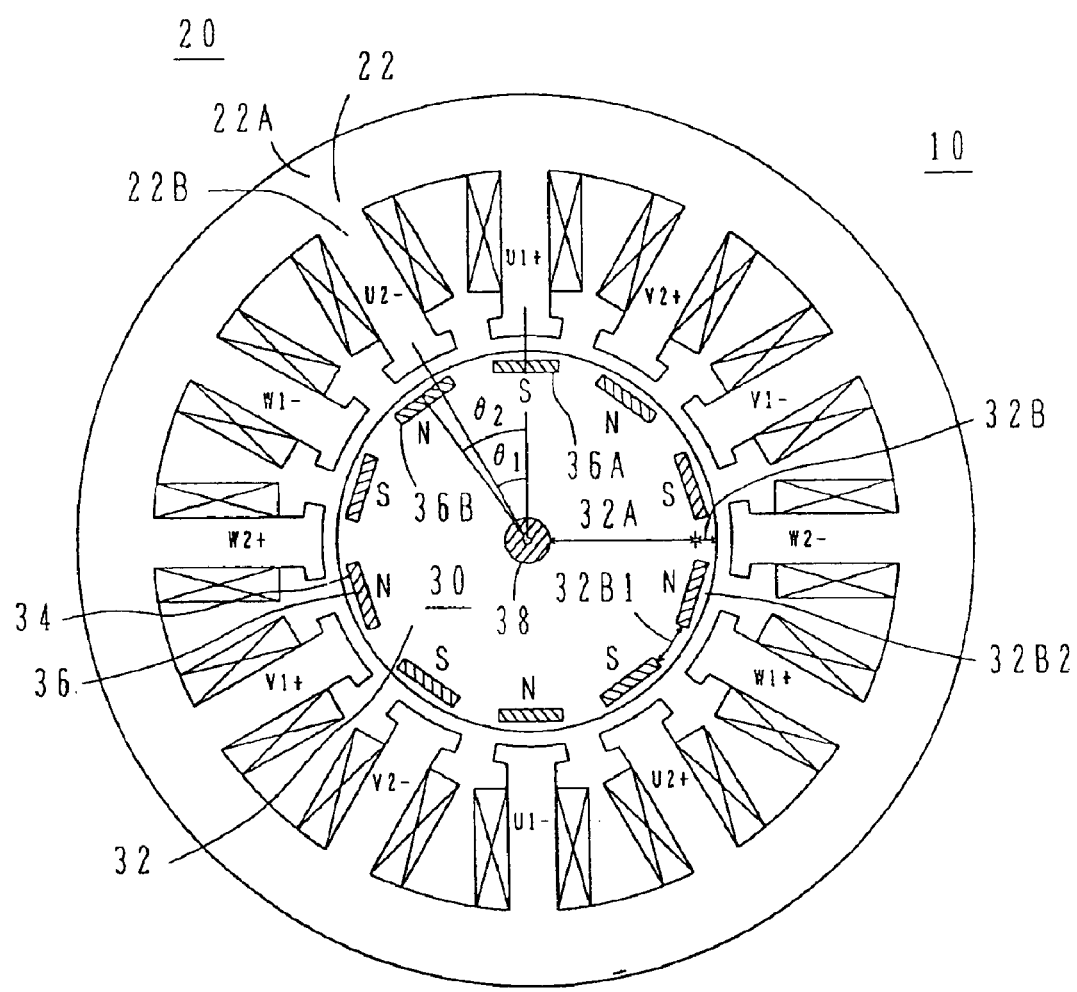
FIG. 2 is a cross-sectional view taken along the section line A—A of FIG. 1, illustrating the permanent magnet rotating electric machine according to the first embodiment of the present invention.

FIG. 2 is a cross-sectional view taken along the section line A—A of FIG. 1, wherein however, the illustration of the housing 26 is omitted.

Referring specifically to FIG. 2, the rotating electric machine 10 comprises the stator 20 and the rotor 30. The rotor 20 comprises the stator core 22 and the stator windings 24. The stator core 22 comprises an annular stator yoke 22A and stator salient poles 22B, and the stator windings 24 are concentratively wound around the stator salient poles 22B. The respective windings 24 are configured not to share a magnetic path on gap surfaces. By employing a stator structure in which the stator windings are implemented by concentrated windings, the length of end coil portions can be reduced, and consequently the physical size of the rotating electric machine can also be reduced. The end coil portions refer to portions of the stator windings 24 projecting from the stator core 24 to the left and right directions in FIG. 1. Since these end coil portions can be reduced, the entire rotating electric machine can be reduced in length, thus resulting in a smaller size of the rotating electric machine.

The U-phase of the stator windings 24 is connected to U1+, U1−, U2+, U2−, respectively; the V-phase is connected to V1+, V1−, V2+, V2−, respectively; and W-phase is connected to W1+, W1−, W2+, W2−, respectively.

The rotor 30 comprises a rotor core 32 formed of a plurality of laminated plates made of a highly magnetically permeable material, for example, silicon steel; four permanent magnets 36 inserted into four permanent magnet inserting holes 34 formed in the rotor core 32; and a shaft 38. Ten permanent magnets 36 are positioned in the circumferential direction of the rotor core 32 at equal intervals such that their polarities are in the opposite directions from each other.

The rotor core 32 is formed with the permanent magnet inserting holes 34 and a hole for passing the shaft 38 therethrough, both formed by punch press. Thus, the rotor 30 is composed of the rotor core 32 made of laminated silicon steel plates and formed with the punch-pressed permanent magnet inserting holes 34 and hole for passing the shaft 38 therethrough, the permanent magnets 36 inserted into the holes 34, and the shaft 38 extending through the hole.

The rotor core 32 may be divided in the radial direction into an inner yoke area 32A and an outer peripheral area 32B. The outer peripheral area 32B of the rotor core 32 may be further divided in the circumferential direction into an auxiliary magnetic pole area 32B1 and a magnetic pole piece area 32B2. The auxiliary magnetic pole area 32B1, which is an area sandwiched by adjacent permanent magnet inserting holes 34, functions to prohibit magnetic circuits of the magnets from passing therethrough and to allow magnetic flux to be directly generated in the stator by a magnetomotive force of the stator. The magnetic pole piece area 32B2 is an area positioned outside the permanent magnets 36 within the outer peripheral area 32B of the rotor core 32, in which magnetic flux Bϕ from the permanent magnets 36 flows through gaps between the permanent magnets 36 and the stator 20 into the stator 20 to form magnetic circuits.

The permanent magnets 36 can be accommodated in the permanent magnet inserting holes 34 which are bordered by the auxiliary magnetic pole area 32B1 in the circumferential direction and bordered by the magnetic pole piece area 32B2 around the outer periphery, thus providing a motor suitable for high speed rotation.

The concentrated winding stator is generally used in reluctance motors and small brash-less motors. In this case, the reluctance motor includes a rotor only having auxiliary magnetic poles, while the brash-less motor has permanent magnets directly disposed on the outer surface of a rotor. Thus, the reluctance motor generate small torque including large pulsating components.

With the surface magnetic rotor, on the other hand, it is relatively difficult to apply a field weakening control thereto. Accordingly the surface magnetic rotor is likely to cause a loss due to an eddy current generated in surface magnets to reduce the efficiency.

In contrast, a structural combination of a rotor employing internal permanent magnets and a concentrated winding stator allows for utilization of torque generated by flux of the permanent magnets as well as torque generated by reluctance components of the auxiliary magnetic poles, thereby providing a higher efficiency. In addition, since the field weakening can be achieved by the effect of the auxiliary magnetic poles, later described, an operating region can be significantly expanded, particularly, in a high speed region.

Further, since the magnetic pole piece area is made of a magnetic material, pulsating flux from the stator salient poles can be mitigated. Also, since the laminated steel core is employed, the rotating electric machine of the first embodiment is free from eddy current losses.

It is assumed in the example illustrated in FIG. 2 that the rotating electric machine is a three-phase motor which comprises the permanent magnet rotor 36 with the number of poles being ten, and the stator with the number of magnetic poles being twelve. When the number of stator salient poles is represented by M and the number of the poles of the rotor magnets by P, a structure satisfying the following relationship:

$$M:P=6n:6n\pm2 \text{ (where n is a positive integer)}$$

can realize reduced torque pulsations and an increased utilization ratio of windings (winding coefficient). It is therefore appreciated that the embodiment illustrated in FIG. 2 can provide a highly efficient, small and light-weight rotating electric machine.

It goes without saying that while the foregoing description has been made in connection with an example of a motor, the first embodiment can be similarly applied to a generator.

Next, a control unit for controlling the permanent magnet rotating electric machine according to the first embodiment will be described with reference to FIG. 3.

Figure 3:
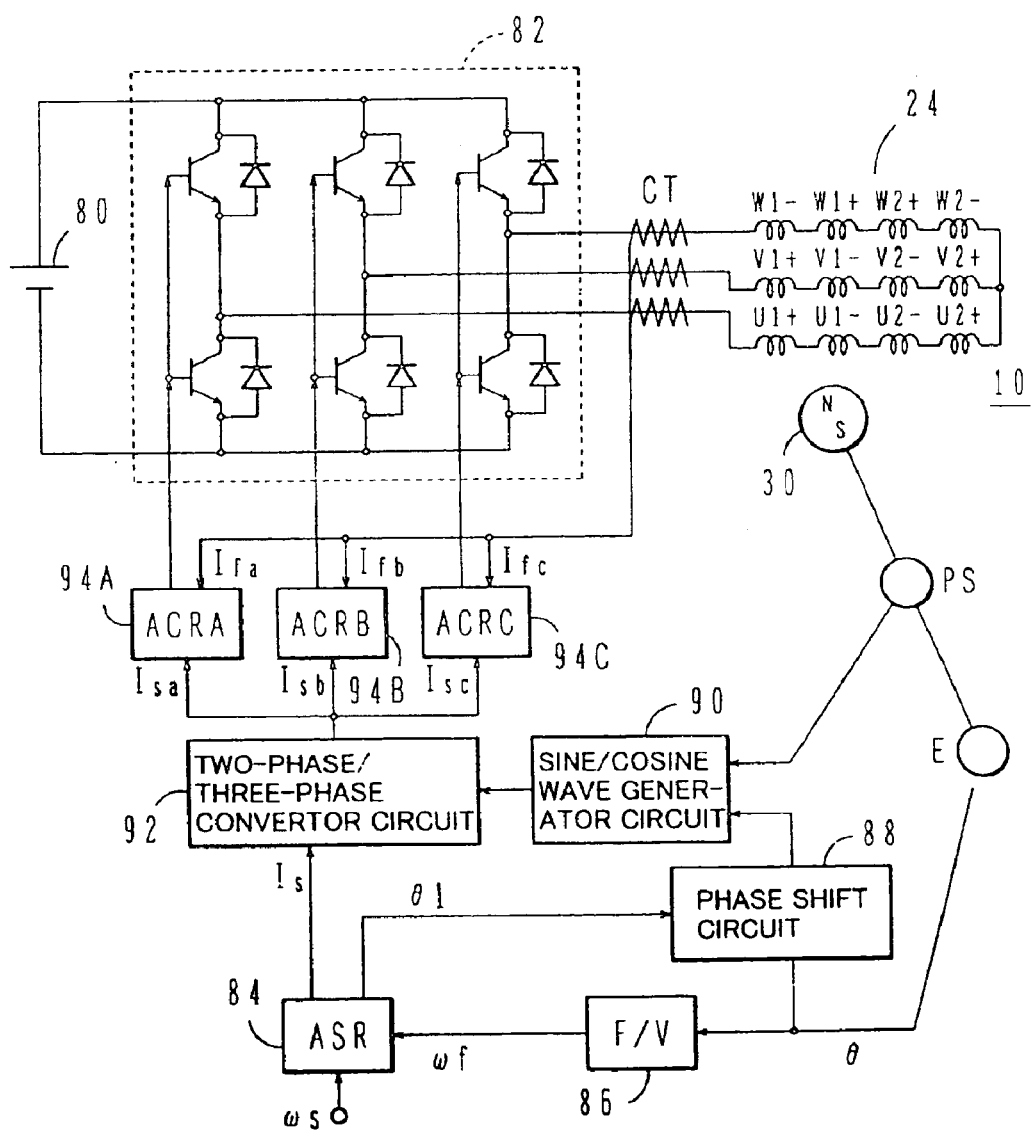
FIG. 3 is a circuit diagram illustrating a control circuit for the permanent magnet rotating electric machine according to the first embodiment of the present invention.

FIG. 3 is a circuit diagram of a control circuit for the permanent magnet rotating electric machine according to the first embodiment.

The stator windings 24 of the rotating electric machine 24 are powered from a direct current power source 80 through an invertor 82. A speed control circuit (ASR) 84 calculates a speed difference me from a speed instruction $\overline{\omega}s$ and an actual speed $\overline{\omega}f$ derived from positional information $\theta$ from the encoder E through an F/V convertor 86, and outputs a torque instruction in accordance with a PI control scheme (P represents a proportional term, and I an integral term) or the like, i.e., a current instruction Is and a rotating angle $\theta1$ for the rotor 30.

A phase shift circuit 88 shifts the phase of pulses from the encoder E, i.e., the positional information $\theta$ from the encoder E in accordance with the rotating angle $\theta1$ instructed from the speed control circuit (ASR) 84. A sine wave/cosine wave generator 90 generates a sine wave output by shifting the phase of an induced voltage of each of the stator windings 24 (three phases in this embodiment) based on the position detector PS for detecting the positions of the magnetic poles of the permanent magnets of the rotor 30 and the positional information $\theta$ on the rotor 30 having its phase shifted by the phase shift circuit 88. The amount of phase shift may be zero.

A two-phase/three-phase convertor circuit 92 outputs current instructions Isa, Isb, Isb to the respective phases in accordance with the current instruction Is from the speed control circuit (ASR) 84 and an output of the sin wave/cosine wave generator 90. The respective phases individually have current control systems (ACR) 94A, 94B, 94C which control respective phase currents by providing the invertor 82 with signals in accordance with the current instructions Isa, Isb, Isc and current detecting signals Ifa, Ifb, Ifc. In this event, a combined current of the respective phase currents is always formed at a position perpendicular to the field flux or at a phase shifted position, so that characteristics equivalent to those of a direct current motor can be achieved without commutator.

When the rotating electric machine of the first embodiment is applied to an electric car, the control unit has a torque control system for directly controlling the torque instead of the speed control circuit 84. In other words, the speed control circuit 84 is replaced with a torque control circuit. The torque control circuit receives torque Ts as an input signal, calculates torque Te from the torque Ts and actual torque Tf detected by a torque detector, and outputs a torque instruction in accordance with a PI control scheme (P represents a proportional term, and I an integral term) or the like, i.e., a current instruction Is and a rotating angle $\theta1$ for the rotor 30.

In a permanent magnet rotating electric machine, since torque is directly proportional to a current, a current control system may be provided instead of the speed control circuit 84.

The connection of the stator windings 24 is made in accordance with a three-phase stator winding scheme. More specifically, U1+, U1−, U2+, U2− are connected in the illustrated order in the U-phase; V1+, V1−, V2+, V2− are connected in the illustrated order in the V-phase; and W1+, W1−, W2+, W2− are connected in the illustrated order in the W-phase. Here, between the windings constituting the respective phases, for example, between U1+ and U2−, and between U1− and U2+ in the U-phase; between V1+ and V2−, and between V1− and V2+ in the V-phase; and between W1+ and W2−, and between W1− and W2+ in the W-phase, there is a phase difference of 30 degrees in electrical angle. Specifically explaining with reference to FIG. 2, for example, an angle $\theta1$ between the stator salient poles U1+ and U2− is 30 degrees, while adjacent permanent magnets 36 of the rotor 30 are angularly spaced by angles $\theta2$. In this way, within the stator salient poles which are wound by the stator windings connected to the same phase, at least one stator salient pole has a phase shifted with respect to the associated permanent magnet. Take, as an example, a stator salient pole around which the winding U1− is wound and a stator salient pole around which the winding U2+ is wound. Assuming that U1− is in phase with the permanent magnet 36A, U1− is shifted from the permanent magnet 36B by an angular distance of 30 degrees. This contributes to a reduction in pulsating pulse which may cause a problem in the concentrated winding stator. The reason for this reduction will be described later with reference to FIG. 4.

A concentrated winding should be constructed such that respective windings do not overlap on the gap surface as illustrated in FIG. 1. This eliminates interference between the respective windings, and a small, light-weight and simple rotating electric machine can be realized.

Also, by selecting adjacent windings to be connected to the same phase as illustrated, the connection is facilitated. Specifically, in the U-phase, U1+ and U2− are adjacent, and U1− and U2+ are adjacent. In the V-phase, V1+ and V2− are adjacent, and V1− and V2+ are adjacent. Similarly, in the W-phase, W1+ and W2− are adjacent, and W1− and W2+ are adjacent, thus facilitating the connection of these windings.

Next, the reason for the reduction in torque pulsation will be explained with reference to FIGS. 4A–4C.

FIGS. 4A–4C show the torque generated by the permanent magnet rotating electric machine according to the first embodiment of the present invention.

FIG. 4A represents torque which is generated when the respective stator windings of U1+, U1−, V1+, V1−, W1+, W1− are applied with a sine wave current based on a signal from the sine wave/cosine wave generator circuit 90 illustrated in FIG. 3. While uniform torque would be generated if no harmonics were included, the inclusion of harmonic components caused by the permanent magnets, harmonic components due to the auxiliary magnetic poles, and so on cause torque pulsation at a period of 60 degrees in electrical angle, as illustrated.

FIG. 4B represents torque which is generated when the respective stator windings of U2+, U2−, V2+, V2−, W2+, W2− are applied with a sine wave current. Since the represented torque includes harmonic components caused by the permanent magnets, harmonic components due to the auxiliary magnetic poles, and so on, as is the case of the torque represented in FIG. 4A, torque pulsations are generated at a period of 60 degrees in electrical angle.

It should be noted herein that since there is a phase difference of 30 degrees in electrical angle between the stator salient poles around which U1+, U1−, V1+, V1−, W1+, W1− of the stator windings 24 are wound and the stator salient poles around which U2+, U2−, V2+, V2−, W2+, W2− of the stator windings 24 are wound, the torque pulsations generated thereby are in opposite phase to each other.

Thus, a combination of torque of FIGS. 4A and 4B exhibits reduced pulsations as shown in FIG. 4C.

Referring back to FIG. 2, in the example in which the ratio of the number of permanent magnet M to the number of stator salient poles P is determined to be 10:12, the cogging torque of the permanent magnet rotating electric machine exhibits a number of pulsations per rotation equal to the least common multiple of the number of permanent magnets and the number of stator salient poles, i.e., 60 per rotation in this example. Generally, the cogging torque is smaller as the number of pulsations per rotation is larger.

In a conventionally used motor having a general surface magnet rotor and a concentrated winding stator, the ratio of the number of permanent magnets M to the number of stator salient poles P is typically 2:3. This ratio corresponds to 10:15 when the number of permanent magnets M is changed from two to ten which is the number of permanent magnets M in the example illustrated in FIG. 2. In this case, the number of pulsations per rotation of the cogging torque is calculated to be 30 which is the least common multiple of 10 and 15. It will be understood from this discussion that the structure of the first embodiment can reduce the cogging torque more than conventional motor of the same type.

In addition, pulsating torque possibly occurring when a current is conducted can be reduced by the principles shown in FIG. 4.

Next, the operation principles of the field weakening control for the permanent magnet rotating electric machine according to the first embodiment will be explained with reference to FIGS. 5A–5C.

Torque T generated by a permanent magnet rotating electric machine is generally expressed by the following equation:

$$T=\{E0 \cdot Iq+(Xq-Xd) \cdot Id \cdot Iq\}/w$$

where E0 is an induced voltage; Xq is reactance on q-axis; Xd is reactance on d-axis; Id is a current on d-axis; Iq is a current on q-axis; and w is an angular rotational speed.

Figure 5A:
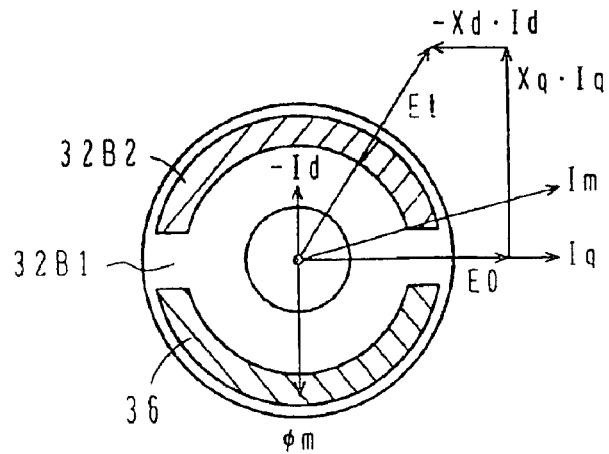
FIGS. 5A–5C are diagrams for explaining the principles of the permanent magnet rotating electric machine according to the first embodiment of the present invention.
Figure 5B:
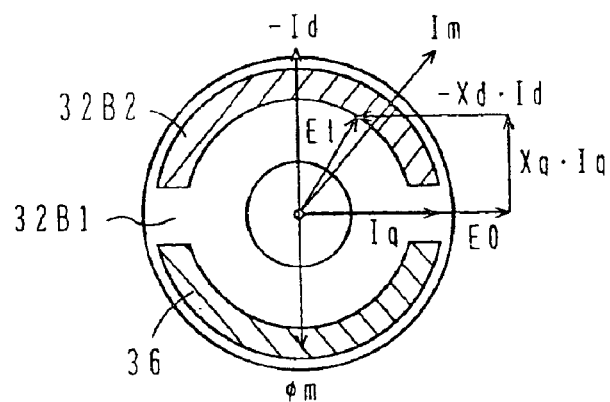

Referring first to FIG. 5A, a permanent magnet 36 is positioned on d-axis, and an auxiliary magnetic pole area 32B1 having a higher magnetic permeability than the permanent magnet 36 is positioned on q-axis. In this arrangement, respective vectors are represented in FIG. 5A. A current Im, which is a combination of the d-axis current Id and the q-axis current Iq, is controlled in the illustrated direction by the current instructions Isa, Isb, Isc generated by the control circuit illustrated in FIG. 3, calculations of output positions of the magnetic pole position detector PS and the encoder E of the rotating electric machine, and so on.

In the foregoing equation, the first term expresses a component of torque generated by the permanent magnet, and the second term expresses a reluctance component generated by the auxiliary magnetic pole area 32B1.

A rotating electric machine for electric car must be controlled so as to maximize the torque/current particularly during a low speed operation. FIG. 5A shows a vector diagram when the rotating electric machine is controlled to generate a maximum torque current. In this event, the rotating electric machine is controlled to apply an increased magnetomotive force to the auxiliary magnetic pole 32B1, thus taking advantage of the torque generated by the permanent magnet, expressed by the first term, as well as the reluctance torque generated by the auxiliary magnetic pole 32B1, expressed by the second term.

In a high speed region, on the other hand, the torque may be small. Rather, the Id component is increased to cancel the induced voltage E0 of the permanent magnet by Xd·Id in order to weaken the flux of the permanent magnet 36, whereby the rotating electric machine can be rotated up to a high speed region. FIG. 5B shows a vector diagram during a high speed operation.

The currents Id, Iq are controlled by the phase shift circuit 88 of the control circuit illustrated in FIG. 3.

Figure 5C:
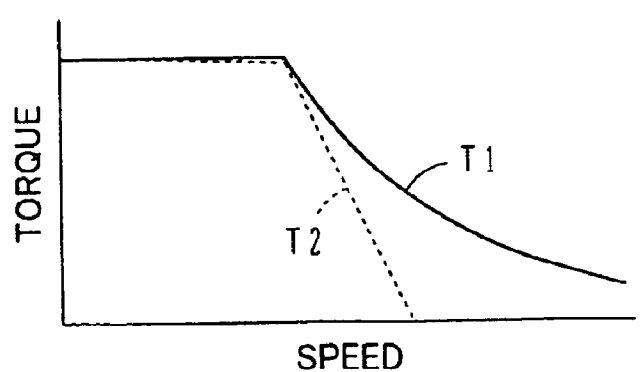

Referring next to FIG. 5C, a broken line T2 represents torque generated by a conventional surface magnet rotating electric machine. It can be seen from the broken line T2 that the torque is decreased in a high speed region. A solid line T1, in turn, represents the relationship between the torque and the speed of the permanent magnet rotating electric machine according to the first embodiment, provided by the control described above. Since the current can more easily pass through as compared with the conventional surface magnet rotating electric machine, the permanent magnet rotating electric machine of the first embodiment can be operated in a higher speed region.

According to the first embodiment, since a concentrated winding stator is employed, the end coil portions of the stator can be reduced, so that a smaller rotating electric machine can be provided.

Also, since the stator salient poles, having wound therearound the stator windings connected to the same phase, include at least one salient pole which has a different phase with respect to the associated permanent magnet, this configuration reduces the pulsating torque which may cause a problem in the concentrated winding stator.

Further, since the permanent magnet rotor is provided with auxiliary magnetic poles, a structure suitable for field weakening control is realized, thereby providing a rotating electric machine appropriate to high speed rotation.

Furthermore, since an auxiliary magnetic pole area made of a magnetic material having a higher magnetic permeability than the permanent magnets is positioned between the permanent magnets, increased torque can be generated.

Moreover, the permanent magnets are surrounded by silicon steel plates, so that a structure suitable for high speed rotation can be provided.

Next, a permanent magnet rotating electric machine according to another embodiment of the present invention will be described with reference to FIG. 6.

Figure 6:
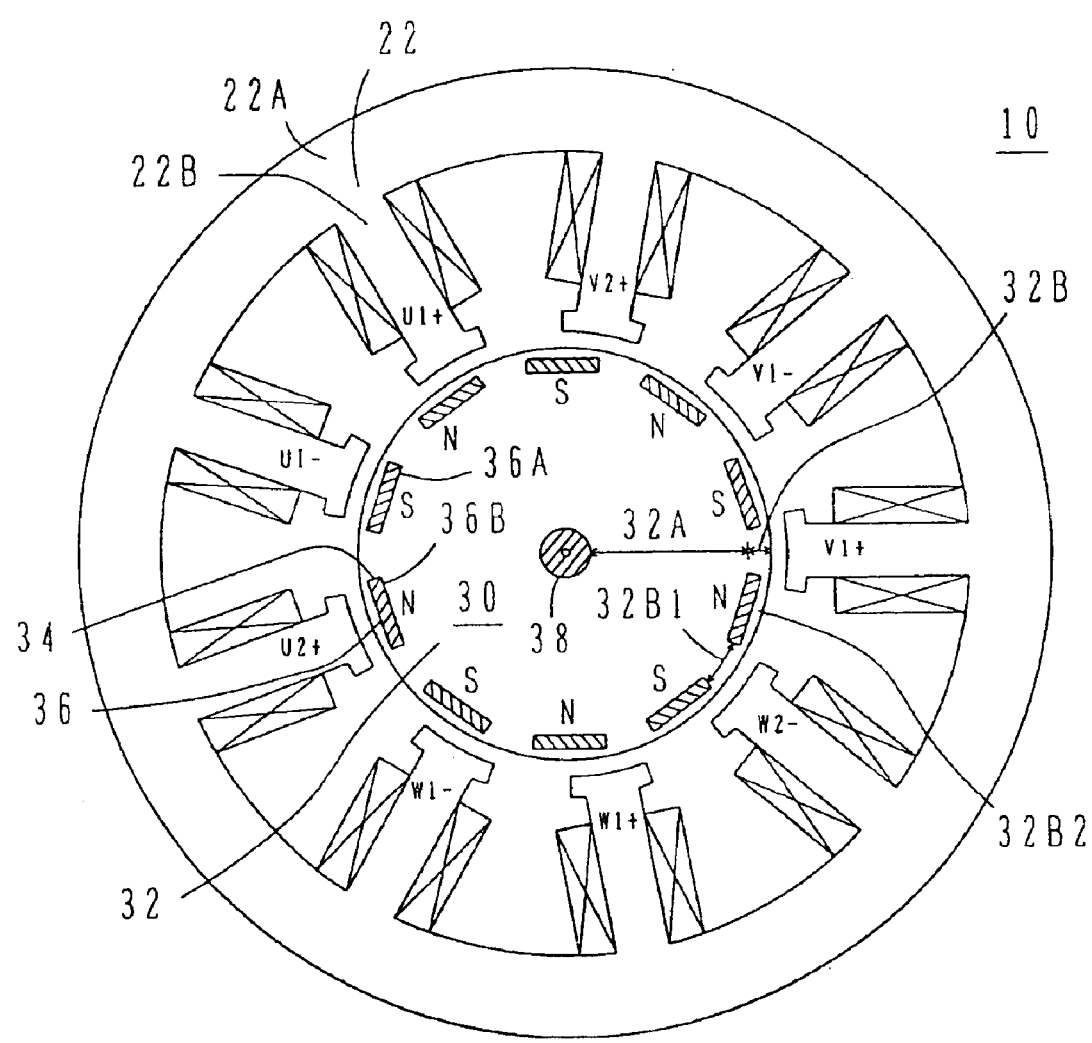
FIG. 6 is a cross-sectional view illustrating a permanent magnet rotating electric machine according to a second embodiment of the present invention.

FIG. 6 is a cross-sectional view illustrating the permanent magnet rotating electric machine according to a second embodiment of the present invention.

The second embodiment is characterized by a three-phase motor structure which comprises a permanent magnet rotor 36 having ten poles (P=10) and a stator having nine magnetic poles (M=9). Thus, when the ratio of the number of stator salient poles M to the number of magnetic poles of the stator magnet P (M:P) is 3n:3n±1, reduced torque pulsations and an increased utilization ratio of windings (winding coefficient) can be realized, so that a highly efficient, small, and light-weight rotating electric machine can be provided.

Referring specifically to FIG. 6, the rotating electric machine 10 comprises a stator 20 and a rotor 30. The rotor 20 comprises a stator core 22 and a stator windings 24. The stator core 22 comprises an annular stator yoke 22A and stator salient poles 22B, and the stator windings 24 are concentratively wound around the stator salient poles 22B. The respective windings 24 are configured not to share a magnetic path on gap surfaces. By employing a stator structure in which the stator windings are implemented by concentrated windings, the length of end coil portions can be reduced, and consequently the physical size of the rotating electric machine can also be reduced.

The U-phase of the stator windings 24 is connected to U1+, U1−, U2+, U2−, respectively; the V-phase is connected to V1+, V1−, V2+, V2−, respectively; and W-phase is connected to W1+, W1−, W2+, W2−, respectively.

The rotor 30 comprises a rotor core 34 formed of a plurality of laminated plates made of a highly magnetic permeable material, for example, silicon steel; four permanent magnets 36 inserted into four permanent magnet inserting holes 34 formed in the rotor cores 32; and a shaft 38. Ten permanent magnets 36 are positioned in the circumferential direction of the rotor core 32 at equal intervals such that their polarities are in the opposite directions from each other.

The rotor core 32 is formed with the permanent magnet inserting holes 34 and a hole for passing the shaft 38 therethrough, both formed by punch press. Thus, the rotor 30 is composed of the rotor core 32 made of laminated silicon steel plates and formed with the punch-pressed permanent magnet inserting holes 34 and hole for passing the shaft 38 therethrough, the permanent magnets 36 inserted into the holes 34, and the shaft 38 extending through the hole.

The rotor core 32 may be divided in the radial direction into an inner yoke area 32A and an outer peripheral area 32B. The outer peripheral area 32B of the rotor core 32 may be further divided in the circumferential direction into an auxiliary magnetic pole area 32B1 and a magnetic pole piece area 32B2. The auxiliary magnetic pole area 32B1, which is an area sandwiched by adjacent permanent magnet inserting holes 34, functions to prohibit magnetic circuits of the magnets from passing therethrough and to allow magnetic flux to be directly generated in the stator by a magnetomotive force of the stator. The magnetic pole piece area 32B2 is an area positioned outside the permanent magnets 36 within the outer peripheral area 32B of the rotor core 32, in which magnetic flux Bϕ from the permanent magnets 36 flows through gaps between the permanent magnets 36 and the stator 20 into the stator 20 to form a magnetic circuit.

The permanent magnets 36 can be accommodated in the permanent magnet inserting holes 34 which are bordered by the auxiliary magnetic pole area 32B1 in the circumferential direction and bordered by the magnetic pole piece area 32B2 around the outer periphery, thus providing a rotating electric machine suitable for high speed rotation.

Further, since the magnetic pole piece area is made of a magnetic material, pulsating flux from the stator salient poles can be mitigated. Also, since the laminated steel core is employed, the rotating electric machine of the second embodiment is free from eddy current losses.

It is assumed in the example illustrated in FIG. 6 that the rotating electric machine is a three-phase motor which comprises the permanent magnet rotor 36 with the number of poles P being ten, and the stator with the number of magnetic poles being nine. When the number of stator salient poles is represented by M and the number of the poles of the rotor magnets by P, a structure satisfying the following relationship:

$$M:P=3n:3n\pm1 \text{ (where } n \text{ is a positive integer)}$$

can realize reduced torque pulsations and an increased utilization ratio of windings (winding coefficient), so that a highly efficient, a small and light-weight rotating electric machine can be provided.

The connection of the stator windings 24 is made in accordance with a three-phase stator winding scheme. More specifically, U1+, U1−, U2+ are connected in the illustrated order in the U-phase; V1+, V1−, V2+ are connected in the illustrated order in the V-phase; and W1+, W1−, W2+ are connected in the illustrated order in the W-phase. Here, the windings constituting the respective phases, for example, U1+ and U1−, and U1− and U2+ in the U-phase; V1+ and V1−, V1− and V2+ in the V-phase; and W1+ and W1−, W1− and W2+ in the W-phase, have a phase difference of 20 degrees in electrical angle. In this way, the stator salient poles having wound therearound the stator windings connected to the same phase, increase at least one stator salient pole which has a different phase with respect to the associated permanent magnet. Take, as an example, a stator salient pole having wound therearound the winding U1− and a stator salient pole having wound therearound the winding U2+. Assuming that U1− is in phase with the permanent magnet 36A, U1− is shifted from the permanent magnet 36B by an angular distance of 30 degrees. This contributes to a reduction in pulsating torque which may cause a problem in the concentrated winding stator.

An electrical angle between adjacent stator salient poles 22B is calculated to be 200 degrees (180×(10/9)=200), and 20 degrees when taking into account the phase difference. The cogging torque of the permanent magnet rotating electric machine exhibits a number of pulsations per rotation equal to the least common multiple of the number of permanent magnets and the number of stator salient poles, i.e., 90 per rotation in this example.

In the example illustrated in FIG. 2 in which the ratio of the number of permanent magnets M to the number of stator salient poles P is 10:12, the cogging torque of the permanent magnet rotating electric machine exhibits pulsations of 60 per rotation. It is understood from this discussion that the second embodiment can further reduce the cogging torque.

It goes without saying that while the foregoing description has been made in connection with an example of a motor, the second embodiment can be similarly applied to a generator.

According to the second embodiment, since a concentrated winding stator is employed, the end coil portions of the stator can be reduced in length, so that a smaller rotating electric machine can be provided.

Also, since the stator salient poles, having wound therearound stator windings connected to the same phase, include at least one salient pole which has a different phase with respect to the associated permanent magnet, this configuration reduces the pulsating torque which may cause a problem in the concentrated winding stator.

In addition, the cogging torque can be further reduced.

Further, since the permanent magnet rotor is provided with auxiliary magnetic poles, a structure suitable for field weakening control is realized, thereby providing a rotating electric machine appropriate to high speed rotations.

Furthermore, since an auxiliary magnetic pole area made of a magnetic material having a higher magnetic permeability than the permanent magnets is positioned between the permanent magnets, increased torque can be generated.

Moreover, the permanent magnets are surrounded by silicon steel plates, so that a rotating electric machine suitable for high speed rotations can be provided.

Next, a permanent magnet rotating electric machine according to a third embodiment of the present invention will be described with reference to FIG. 7.

Figure 7:
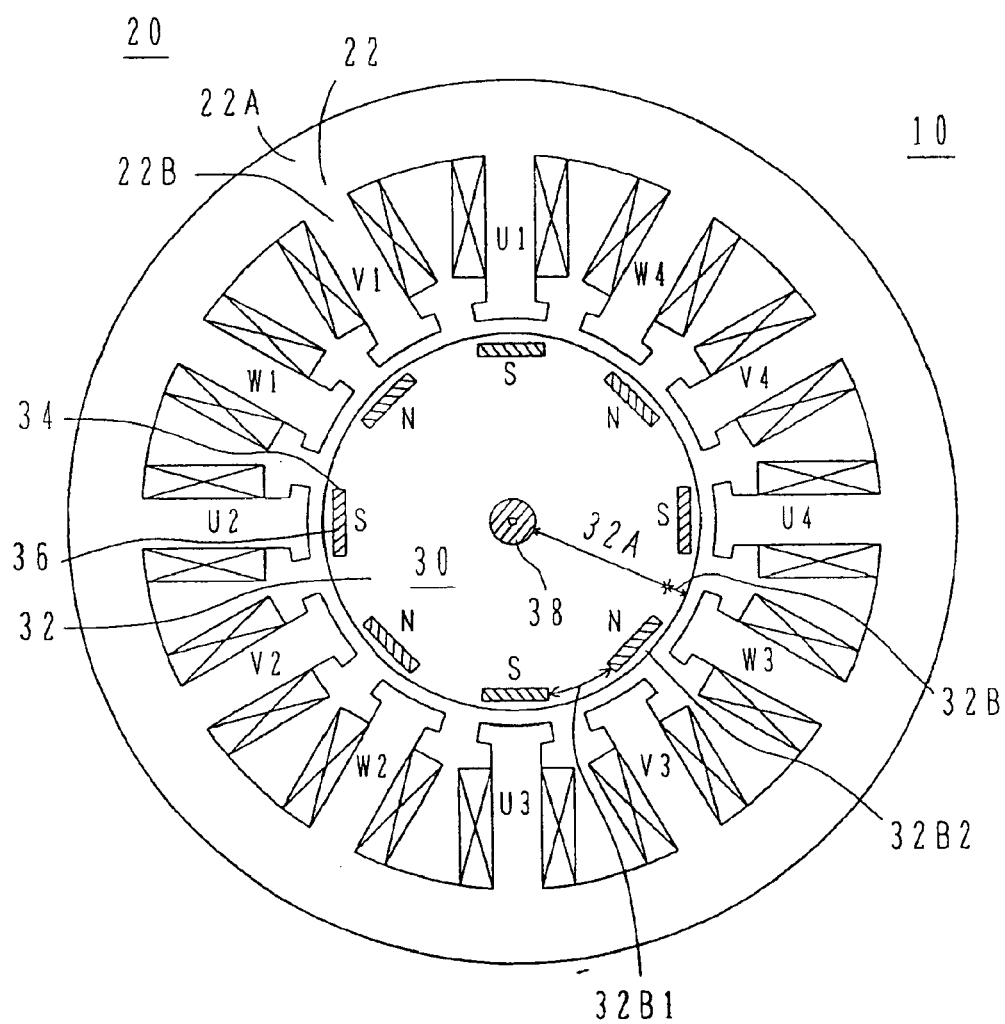
FIG. 7 is a cross-sectional view illustrating a permanent magnet rotating electric machine according to a third embodiment of the present invention.

FIG. 7 is a cross-sectional view illustrating the permanent magnet rotating electric machine according to the third embodiment of the present invention.

The third embodiment is characterized by a three-phase motor structure which comprises a permanent magnet rotor 36 having twelve poles (P=12) and a stator having eight magnetic poles (M=8). Since this structure can increase the utilization ratio of windings (winding coefficient), a highly efficient, small, and light-weight rotating electric machine can be provided.

Referring specifically to FIG. 7, the rotating electric machine 10 comprises a stator 20 and a rotor 30. The rotor 20 comprises a stator core 22 and a stator windings 24. The stator core 22 comprises an annular stator yoke 22A and stator salient poles 22B, and the stator windings 24 are concentratively wound around the stator salient poles 22B. The respective windings 24 are configured not to share a magnetic path on gap surfaces. By employing a stator structure in which the stator windings are implemented by concentrated windings, end coil portions can be reduced in length, and consequently the physical size of the rotating electric machine can also be reduced.

The U-phase of the stator windings 24 is connected to U1, U2, U3, U4, respectively; the V-phase is connected to V1, V2, V3, V4, respectively; and W-phase is connected to W1, W2, W3, W4, respectively.

The rotor 30 comprises a rotor core 34 formed of a plurality of laminated plates made of a highly magnetic permeable material, for example, silicon steel; four permanent magnets 36 inserted into four permanent magnet inserting holes 34 formed in the rotor cores 32; and a shaft 38. Ten permanent magnets 36 are positioned in the circumferential direction of the rotor core 32 at equal intervals such that their polarities are in the opposite directions from each other.

The rotor core 32 is formed with the permanent magnet inserting holes 34 and a hole for passing the shaft 38 therethrough, both formed by punch press. Thus, the rotor 30 is composed of the rotor core 32 made of laminated silicon steel plates and formed with the punch-pressed permanent magnet inserting holes 34 and hole for passing the shaft 38 therethrough, the permanent magnets 36 inserted into the holes 34, and the shaft 38 extending through the hole.

The rotor core 32 may be divided in the radial direction into an inner yoke area 32A and an outer peripheral area 32B. The outer peripheral area 32B of the rotor core 32 may be further divided in the circumferential direction into an auxiliary magnetic pole area 32B1 and a magnetic pole piece area 32B2. The auxiliary magnetic pole area 32B1, which is an area sandwiched by adjacent permanent magnet inserting holes 34, functions to prohibit magnetic circuits of the magnets from passing therethrough and to allow magnetic flux to be directly generated in the stator by a magnetomotive force of the stator. The magnetic pole piece area 32B2 is an area positioned outside the permanent magnets 36 within the outer peripheral area 32B of the rotor core 32, in which magnetic flux Bφ from the permanent magnets 36 flows through gaps between the permanent magnets 36 and the stator 20 into the stator 20 to form a magnetic circuit.

The permanent magnets 36 can be accommodated in the permanent magnet inserting holes 34 which are bordered by the auxiliary magnetic pole area 32B1 in the circumferential direction and bordered by the magnetic pole piece area 32B2 around the outer periphery, thus providing a rotating electric machine suitable for high speed rotation.

Further, since the magnetic pole piece area is made of a magnetic material, pulsating flux from the stator salient poles can be mitigated. Also, since the laminated steel core is employed, the rotating electric machine of the second embodiment is free from eddy current losses.

It is assumed in the example illustrated in FIG. 7 that the rotating electric machine is a three-phase motor which comprises the permanent magnet rotor 36 with the number of poles P being twelve, and the stator with the number of magnetic poles being eight. Since such a structure achieves an increased utilization ratio of the windings (winding coefficient), a highly efficient, small and light-weight rotating electric machine can be provided.

The connection of the stator windings 24 is made in accordance with a three-phase stator winding scheme. More specifically, U1, U2, U3, U4 are connected in the illustrated order in the U-phase; V1, V2, V3, V4 are connected in the illustrated order in the V-phase; and W1, W2, W3, W4 are connected in the illustrated order in the W-phase. The windings forming parts of the U-phase, V-phase, W-phase have a phase difference of 60 degrees between each other.

In the third embodiment, the stator salient poles having wound therearound the stator windings connected to the same phase are in phase with the associated permanent magnets, so that a reduction in torque pulsation is not expected. However, since the salient poles in phase with the permanent magnets are positioned in a symmetric configuration, a well balanced structure can be provided. More specifically explaining with reference to the U-phase, the respective salient poles U1, U2, U3, U4 are positioned symmetrically about the shaft 38.

It goes without saying that while the foregoing description has been made in connection with an example of a motor, the third embodiment can be similarly applied to a generator.

According to the third embodiment, since a concentrated winding stator is employed, the end coil portions of the stator can be reduced in length, so that a smaller rotating electric machine can be provided.

Also, since the permanent magnet rotor is provided with auxiliary magnetic poles, a structure suitable for field weakening control is realized, thereby providing a rotating electric machine appropriate to high speed rotations.

Further, since an auxiliary magnetic pole area made of a magnetic material having a higher magnetic permeability than the permanent magnets is positioned between the permanent magnets, increased torque can be generated.

Moreover, the permanent magnets are surrounded by silicon steel plates, so that a rotating electric machine suitable for high speed rotations can be provided.

Next, a permanent magnet rotating electric machine according to a fourth embodiment of the present invention will be described with reference to FIG. 8.

Figure 8:
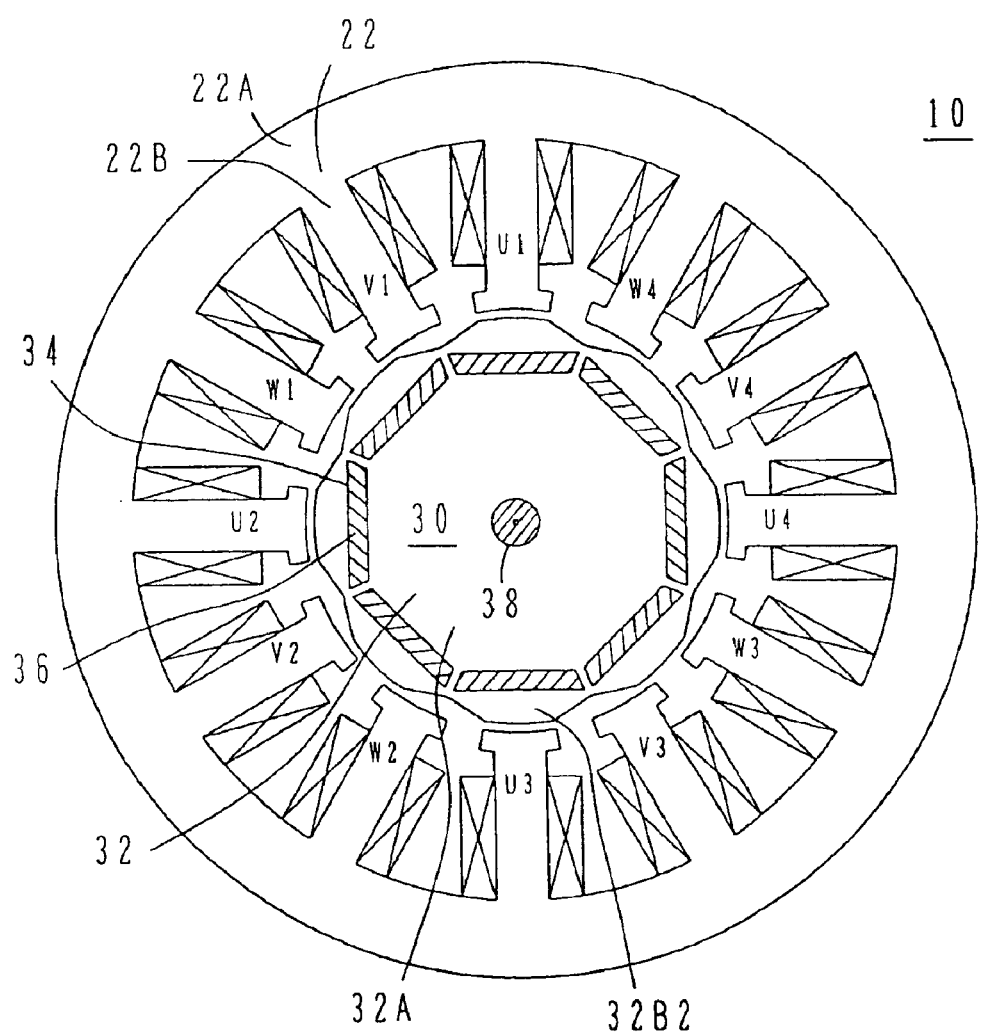
FIG. 8 is a cross-sectional view illustrating a permanent magnet rotating electric machine according to a fourth embodiment of the present invention.

FIG. 8 is a cross-sectional view illustrating the permanent magnet rotating electric machine according to the fourth embodiment of the present invention.

The fourth embodiment is characterized by a three-phase motor structure which comprises a permanent magnet rotor 36 having twelve poles (P=12) and a stator having eight magnetic poles (M=8). Since this structure can increase the utilization ratio of windings (winding coefficient), a highly efficient, small, and light-weight rotating electric machine can be provided.

In addition, a magnetic pole piece area of the rotor is projected toward the magnetic poles of the stator, such that a sinusoidal magnetic flux distribution is produced.

Referring specifically to FIG. 8, the rotating electric machine 10 comprises a stator 20 and a rotor 30. The rotor 20 comprises a stator core 22 and a stator windings 24. The stator core 22 comprises an annular stator yoke 22A and stator salient poles 22B, and the stator windings 24 are concentratively wound around the stator salient poles 22B. The respective windings 24 are configured not to share a magnetic path on gap surfaces. By employing a stator structure in which the stator windings are implemented by concentrated windings, end coil portions can be reduced in length, and consequently the physical size of the rotating electric machine can also be reduced.

The U-phase of the stator windings 24 is connected to U1, U2, U3, U4, respectively; the V-phase is connected to V1, V2, V3, V4, respectively; and W-phase is connected to W1, W2, W3, W4, respectively.

The rotor 30 comprises a rotor core 34 formed of a plurality of laminated plates made of a highly magnetic permeable material, for example, silicon steel; four permanent magnets 36 inserted into four permanent magnet inserting holes 34 formed in the rotor cores 32; and a shaft 38. Ten permanent magnets 36 are positioned in the circumferential direction of the rotor core 32 at equal intervals such that their polarities are in the opposite directions from each other.

The rotor core 32 is formed with the permanent magnet inserting holes 34 and a hole for passing the shaft 38 therethrough, both formed by punch press. Thus, the rotor 30 is composed of the rotor core 32 made of laminated silicon steel plates and formed with the punch-pressed permanent magnet inserting holes 34 and hole for passing the shaft 38 therethrough, the permanent magnets 36 inserted into the holes 34, and the shaft 38 extending through the hole.

The rotor core 32 may be divided in the radial direction into an inner yoke area 32A and an outer peripheral area 32B. The outer peripheral area 32B of the rotor core 32 may be further divided in the circumferential direction into an auxiliary magnetic pole area 32B1 and a magnetic pole piece area 32B2. The auxiliary magnetic pole area 32B1, which is an area sandwiched by adjacent permanent magnet inserting holes 34, functions to prohibit magnetic circuits of the magnets from passing therethrough and to allow magnetic flux to be directly generated in the stator by a magnetomotive force of the stator. In the fourth embodiment, the magnetic pole piece area of the rotor is projected toward the stator magnetic poles 22B to shape a sinusoidal magnetic flux distribution.

The permanent magnets 36 can be accommodated in the permanent magnet inserting holes 34 which are bordered by the auxiliary magnetic pole area 32B1 in the circumferential direction and bordered by the magnetic pole piece area 32B2 around the outer periphery, thus providing a rotating electric machine suitable for high speed rotation.

Further, since the magnetic pole piece area is made of a magnetic material, pulsating flux from the stator salient poles can be mitigated. Also, since the laminated steel core is employed, the rotating electric machine of the second embodiment is free from eddy current losses.

It is assumed in the example illustrated in FIG. 8 that the rotating electric machine is a three-phase motor which comprises the permanent magnet rotor 36 with the number of poles P being twelve, and the stator with the number of magnetic poles being eight. Since such a structure achieves an increased utilization ratio of the windings (winding coefficient), a highly efficient, small and light-weight rotating electric machine can be provided.

The connection of the stator windings 24 is made in accordance with a three-phase stator winding scheme. More specifically, U1, U2, U3, U4 are connected in the illustrated order in the U-phase; V1, V2, V3, V4 are connected in the illustrated order in the V-phase; and W1, W2, W3, W4 are connected in the illustrated order in the W-phase. The windings forming parts of the U-phase, V-phase, W-phase have a phase difference of 60 degrees between each other.

In the fourth embodiment, the stator salient poles, having wound therearound the stator windings connected to the same phase, are in phase with the associated permanent magnets, so that a reduction in torque pulsation is not expected. However, since the salient poles in phase with the permanent magnets are positioned in a symmetric configuration, a well balanced structure can be provided. More specifically explaining with reference to the U-phase, the respective salient poles U1, U2, U3, U4 are positioned symmetrically about the shaft 38.

It goes without saying that while the foregoing description has been made in connection with an example of a motor, the fourth embodiment can be similarly applied to a generator.

According to the fourth embodiment, since a concentrated winding stator is employed, the end coil portions of the stator can be reduced in length, so that a smaller rotating electric machine can be provided.

Also, since the permanent magnet rotor is employed, a structure suitable for field weakening control is realized, thereby providing a rotating electric machine appropriate to high speed rotations.

Moreover, the permanent magnets are surrounded by silicon steel plates, so that a rotating electric machine suitable for high speed rotations can be provided.

While the foregoing respective embodiments have been described in connection with a control system which controls a sinusoidal current with respect to the position of the rotor, it goes without saying that the present invention may also be applied to a 120 degree conductive brash-less motor scheme which does not perform a current control.

Also, while the foregoing description has been made with reference to an internal rotation type motor, the present invention may also be applied to external rotation type motors, generators, and linear motors.

Next, an electric car employing a permanent magnet rotating electric machine according to a fifth embodiment will be described with reference to FIG. 9.

Figure 9:
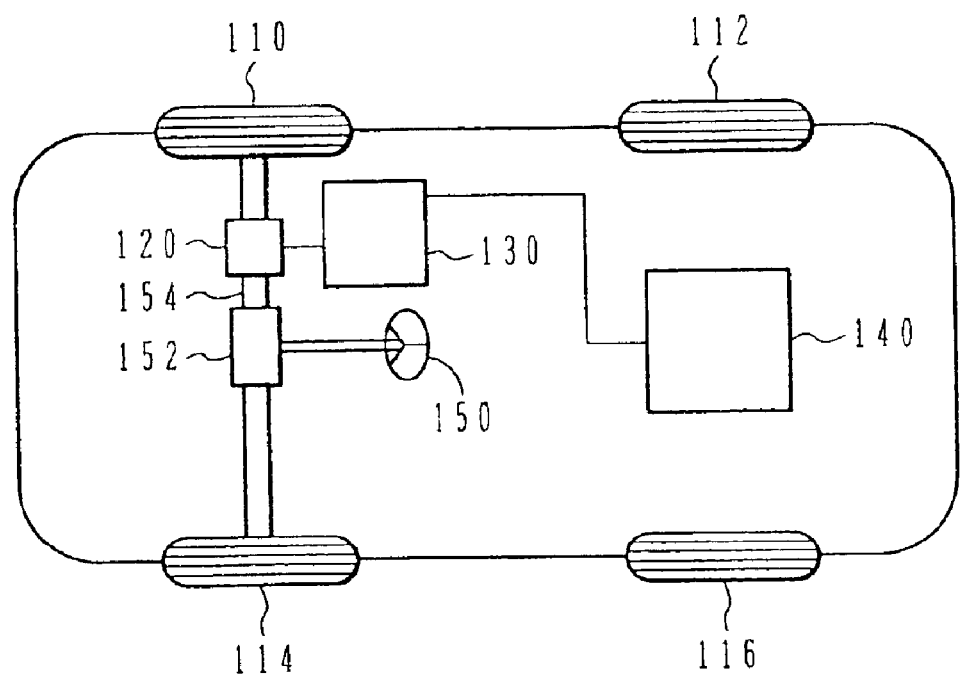
FIG. 9 is a block diagram illustrating an electric car equipped with a permanent magnet rotating electric machine according to a fifth embodiment of the present invention.

FIG. 9 is a block diagram illustrating the configuration of an electric car which is equipped with a permanent magnet rotating electric machine according to the fifth embodiment of the present invention.

A body 100 of the electric car is supported by four wheels 110, 112, 114, 116. Since this electric car is a front-wheel driven type, a permanent magnet rotating electric machine 120 is directly coupled to a front wheel shaft 154. The permanent magnet rotating electric machine 120 has a structure as illustrated in FIG. 2, 6, 7 or 8. A control unit 130 is provided for controlling driving torque of the permanent magnet rotating electric machine 120. A battery 140 is provided as a power source for the control unit 130. Electric power from the battery 140 is supplied to the permanent magnet rotating electric machine 120 through the control unit 130, thereby driving the permanent magnet rotating electric machine 120 to rotate the wheels 110, 114. The rotation of a steering wheel 150 is transmitted to the two wheels 110, 114 through a transmission mechanism including a steering ring gear 152, a tie rod, a knuckle arm, and so on to change the angle of the wheels 110, 114.

It should be noted that while in the foregoing embodiment, the permanent magnet rotating electric machine has been described to be used for driving wheels of an electric car, the permanent magnet rotating electric machine may also be used for driving wheels of an electric locomotive or the like.

According to the fifth embodiment, when the permanent magnet rotating electric machine is applied to an electrically driven vehicle, particular to an electric car, a small, lightweight, and highly efficient permanent magnet rotating electric machine can be equipped in the vehicle, thus making it possible to provide an electric car which can run a longer distance with the amount of electric power accumulated in one recharging operation.

What is claimed is:

1. A permanent magnet rotating electric machine for a vehicle, comprising:
   a stator having stator windings wound concentratively;
   a rotor held rotatably inside said stator and having a rotor core formed of a plurality of laminated steel plates;
   a plurality of holes arranged circumferentially about said rotor core radially inwardly from a perimeter in a radial direction thereof;
   a plurality of permanent magnets arranged in said plurality of holes with alternately reversing polarity at each pole respectively;
   magnetic pole piece areas provided at said rotor core, radially outward of said permanent magnets;
   auxiliary magnetic pole areas disposed at said rotor core, between said permanent magnets of said pole so as to generate a reluctance torque; wherein,
   said stator and rotor are configured so as to generate a rotational torque based on a torque generated by said permanent magnets and on said reluctance torque;
   said stator windings generate magnetic flux by receiving current that is controlled in response to a position of said permanent magnets of said rotor; and
   said auxiliary magnetic pole areas generate said reluctance torque by said magnetic flux generated by said stator windings.

2. A permanent magnet rotating electric machine for a vehicle driven by electric power of a battery carried on the vehicle, said machine comprising:
   a stator having a stator core on which stator windings are wound concentratively;
   a rotor having a laminated rotor core, and held rotatably inside said stator;
   a plurality of permanent magnets inserted in a plurality of holes provided in said rotor core, with alternately reversing polarity at each pole respectively;
   magnetic pole piece areas provided at an outer periphery of said rotor core; and
   auxiliary magnetic pole areas provided at said rotor core between said permanent magnets of each pole, for generating a reluctance torque; wherein,
   said magnetic pole piece areas in said laminated rotor core ease pulsated magnetic flux acting from said stator to said permanent magnets;
   said stator and rotor are configured to provide a rotational torque based on a torque generated in response to a magnetic flux acting from said permanent magnets to said stator via said magnetic pole piece areas and said reluctance torque generated by said auxiliary magnetic pole areas;
   said stator windings generate magnetic flux by receiving current that is controlled in response to a position of said permanent magnets of said rotor; and
   said auxiliary magnetic pole areas generate said reluctance torque by said magnetic flux generated by said stator windings.

3. A permanent magnet rotating electric machine for a vehicle comprising:
   a stator having a plurality of stator cores on which multi-phase windings are wound concentratively;
   a rotor held rotatably inside said stator, and having a rotor core formed of a plurality of laminated silicon steel plates;
   a plurality of permanent magnets inserted in a plurality of holes arranged circumferentially about said rotor core, with a polarity at each respective pole being opposite that of circumferentially adjacent magnets;
   magnetic pole piece areas provided at an outer periphery of said rotor core; and
   auxiliary magnetic pole areas provided at said rotor core, between said permanent magnets of each pole; wherein,
   a rotational torque is generated based on a torque generated in response to a magnetic flux acting from said permanent magnets to said stator via said magnetic pole piece areas and a reluctance torque generated by said auxiliary magnetic pole areas;
   said stator windings generate magnetic flux by receiving current that is controlled in response to a position of said permanent magnets of said rotor;
   said auxiliary magnetic pole areas generate said reluctance torque by said magnetic flux generated by said stator windings;
   further same phase, windings are wound around a plurality of stator salient poles; and
   a winding wound on at least one of said plurality of stator salient poles for which same-phase winding are wound has a phase difference of voltage for the other same-phase winding.

4. A permanent magnet rotating electric machine for a vehicle driven by an electric power of a battery carried on the vehicle, comprising:
   a stator having a plurality of stator cores on which three-phase windings are wound concentratively;
   a rotor held rotatably inside said stator, and having a rotor core formed of a plurality of laminated silicon steel plates;
   a plurality of holes disposed circumferentially about said rotor core;
   a plurality of permanent magnets inserted in said plurality of holes, with alternating polarity at each respective pole relative to its circumferential neighbors; and
   auxiliary magnetic pole areas provided between said permanent magnets of each pole; wherein,
   a rotational torque is generated based on a torque generated in response to a magnetic flux acting from said permanent magnets to said stator and a reluctance torque generated by said auxiliary magnetic pole areas;
   said stator windings generate magnetic flux by receiving current that is controlled in response to a position of said permanent magnets of said rotor;
   said auxiliary magnetic pole areas generate said reluctance torque by said magnetic flux generated by said stator windings;
   further, same phase, windings are wound around a plurality of stator salient poles; and
   a winding wound on at least one of said plurality of stator salient poles on which same-phase winding are wound has a phase difference of voltage for the other same-phase winding.

5. A permanent magnet rotating electric machine for a vehicle driven by electric power of a battery carried on the vehicle, said machine, comprising:
- a stator having a plurality of stator cores on which three-phase windings are wound concentratively, and having a plurality of stator salient poles;
- a rotor held rotatably inside said stator, and having a rotor core;
- a plurality of permanent magnets arranged circumferentially about said rotor core, counter to said stator salient poles, with alternately opposite polarity in the circumferential direction; and
- auxiliary magnetic pole areas provided at said rotor core, between said permanent magnets of each pole; wherein,
- a rotational torque is generate based on a torque generated in response to a magnetic flux acting from said permanent magnets to said stator and a reluctance torque generated by said auxiliary magnetic pole areas;
- said stator windings generate magnetic flux by receiving current that is controlled in response to a position of said permanent magnets of said rotor;
- said auxiliary magnetic pole areas generate said reluctance torque by said magnetic flux generated by said stator windings;
- the relationship M:P=6n:6n±2 or M:P=3n:3n±2 is satisfied, where M is the number of said stator salient poles, P is the number of said permanent magnets, and n is a positive integer.

6. A permanent magnet rotating electric machine according to claim 5, wherein the number of the poles of said rotor having said permanent magnets is one of eight and ten.

7. A permanent magnet rotating electric machine for a vehicle driven by electric power of a battery carried on the vehicle, said machine, comprising:
- a stator having a plurality of stator cores on which three-phase windings are wound concentratively, and having a plurality of stator salient poles:
- a rotor held rotatably inside said stator, and having a rotor core formed of a plurality of laminated silicon steel plates;
- a plurality of circumferentially disposed holes provided at said rotor core;
- a plurality of permanent magnets inserted in said plurality of holes, counter to said stator salient poles and having alternating polarity at each respective pole relative to its neighbors; and
- auxiliary magnetic pole areas provided at areas between said permanent magnets of each pole; wherein,
- a rotational torque is generated based on a torque generated in response to a magnetic flux acting from said permanent magnets to said stator and a reluctance torque generated by said auxiliary magnetic pole areas;
- said stator windings generate magnetic flux by receiving current that is controlled in response to a position of said permanent magnets of said rotor;
- said auxiliary magnetic pole areas generate said reluctance torque by said magnetic flux generated by said stator windings; and
- the relationship M:P=6n:6n±2 or M:P=3n:3n±2 is satisfied, where M is the number of said stator salient poles, P is the number of said permanent magnets, and n is a positive integer.

8. A permanent magnet rotating electric machine according to claim 7, wherein the number of the poles of said rotor having said permanent magnets is one of eight and ten.

9. A permanent magnet rotating electric machine for a vehicle driven by electric power of a power source carried on the vehicle, said machine comprising:
- a stator having a plurality of stator cores on which three-phase windings are wound concentratively;
- a rotor held rotatably inside said stator, and having a rotor core formed of a plurality of laminated silicon steel plates;
- a plurality of permanent magnets inserted in a plurality of holes arranged circumferentially about said rotor core, with alternately reversing polarity at each respective pole; and
- auxiliary magnetic pole areas provided between said permanent magnets of each neighboring pole of said rotor core; wherein,
- a rotational torque is generated based on a torque generated in response to a magnetic flux acting from said permanent magnets to said stator and a reluctance torque generated by said auxiliary magnetic pole areas;
- said stator windings generate magnetic flux by receiving current that is controlled in response to a position of said permanent magnets of said rotor;
- said auxiliary magnetic pole areas generate said reluctance torque by said magnetic flux generated by said stator windings;
- further, same phase, windings are wound around a plurality of stator salient poles; and
- a winding wound on at least one of said plurality of stator salient poles on which same-phase winding are wound has a phase difference of voltage for the other same-phase winding; and
- the relationship M:P=6N:6n±2 or M:P=3n:3n±2 is satisfied, where M is the number of said stator salient poles, P is the number of said permanent magnets, and n is a positive integer.

10. A permanent magnet rotating electric machine according to claim 9, wherein the number of the poles of said rotor having said permanent magnets is one of eight and ten.

11. A permanent magnet rotating electric machine for a vehicle driven by a battery carried on the vehicle, said machine comprising:
- a stator having a plurality of stator cores on which three-phase windings are wound concentratively;
- a rotor held rotatably inside said stator, and having a rotor core formed of a plurality of laminated silicon steel plates;
- a plurality of permanent magnets inserted in a plurality of holes that are arranged circumferentially about said rotor core, with each respective magnet having a polarity opposite that of circumferentially adjacent magnets; and
- auxiliary magnetic pole areas provided between said permanent magnets of each neighboring pole; wherein,
- magnetic pole piece areas are provided at said rotor core, radially outward of said permanent magnets;
- a rotational torque is generated based on a torque generated in response to a magnetic flux acting from said permanent magnets to said stator via said magnetic pole piece areas and a reluctance torque generated by said auxiliary magnetic pole areas;
- said stator windings generate magnetic flux by receiving current that is controlled in response to a position of said permanent magnets of said rotor;

said auxiliary magnetic pole areas generate said reluctance torque by said magnetic flux generated by said stator windings;

further, same phase windings, are wound around a plurality of stator salient poles;

a winding wound on at least one of said plurality of stator salient poles on which same-phase winding are wound has a phase difference of voltage for the other same-phase winding; and the relationship $M:P=6N:6n\pm2$ or $M:P=3n:3n\pm2$ is satisfied, where M is the number of said stator salient poles, P is the number of said permanent magnets, and n is a positive integer.

12. A permanent magnet rotating electric machine according to claim 11, wherein the number of the poles of said rotor having said permanent magnets is one of eight and ten.

13. An automobile having a DC power source, a permanent magnet rotating electric machine and a control circuit, wherein said permanent magnet rotating electric machine comprises:

a stator having stator windings wound concentratively;

a rotor held rotatably inside said stator and having a rotor core formed of a plurality of laminated steel plates;

a plurality of holes arranged circumferentially about said rotor core, radially inwardly from a perimeter in a radial direction thereof;

a plurality of permanent magnets arranged in said plurality of holes with alternately reversing polarity at each pole respectively;

magnetic pole piece areas provided at said rotor core, radially outward of said permanent magnets;

auxiliary magnetic pole areas disposed at said rotor core, between said permanent magnets of each pole so as to generate a reluctance torque; wherein, said stator and rotor are configured so as to generate a rotational torque based on a torque generated by said permanent magnets and on said reluctance torque;

said DC power source supplies current to said stator winding through said control circuit;

said automobile further comprises magnet pole position detecting means for detecting a position of said permanent magnet of said rotor; and said control circuit generates magnetic flux to said stator winding by controlling a current flowing through said stator winding based on a position of said permanent magnet detected by said magnet pole position detecting means, generates said reluctance torque by said magnetic flux at said auxiliary magnetic pole areas, and controls said permanent magnet rotating electric machine by field weakening control at a high rotational speed of said permanent magnet rotating electric machine.

14. An automobile having a battery for supplying electric power, a permanent magnet rotating electric machine and a control circuit for controlling an electric power supplied to said permanent magnet rotating electric machine, wherein said permanent magnet rotating electric machine comprises:

a stator having a stator core on which stator windings are wound concentratively;

a rotor having a laminated rotor core, and held rotatably inside said stator;

a plurality of permanent magnets inserted in a plurality of holes provided in said rotor core, with alternately reversing polarity at each pole respectively;

magnetic pole piece areas provided at an outer periphery of said rotor core; and auxiliary magnetic pole areas provided at said rotor core, between said permanent magnets of each pole, for generating a reluctance torque; wherein, said magnetic pole piece areas in said laminated rotor core ease pulsated magnetic flux acting from said stator to said permanent magnets;

said stator and rotor are configured to provide a rotational torque based on a torque generated in response to a magnetic flux acting from said permanent magnets to said stator via said magnetic pole piece areas and said reluctance torque generated by said auxiliary magnetic pole areas;

said automobile further comprises magnet pole position detecting means for detecting a position of said permanent magnet of said rotor; and said control circuit generates magnetic flux to said stator winding by controlling a current flowing through said stator winding based on a position of said permanent magnet detected by said magnet pole position detecting means, generates a reluctance torque by said magnetic flux at said auxiliary magnetic pole areas, and controls current supplied to said stator winding such that a rotational torque at a low rotational speed of said permanent magnet rotating electric machine is smaller than rotational torque at a high rotational speed.

15. An automobile having a DC power source, a permanent magnet rotating electric machine and a control circuit, wherein said permanent magnet rotating electric machine comprises:

a stator having a plurality of stator cores on which multi-phase windings are wound concentratively;

a rotor held rotatably inside said stator, and having a rotor core formed of a plurality of laminated silicon steel plates;

a plurality of permanent magnets inserted in a plurality of holes arranged circumferentially about said rotor core, a polarity at each respective pole being opposite that of circumferentially adjacent magnets;

magnetic pole piece areas provided at an outer periphery of said rotor core; and auxiliary magnetic pole areas provided at said rotor core, between said permanent magnets of each pole; wherein, a rotational torque is generated based on a torque generated in response to a magnetic flux acting from said permanent magnets to said stator via said magnetic pole piece areas and a reluctance torque generated by said auxiliary magnetic pole areas;

said stator windings generate magnetic flux by receiving current that is controlled in response to a position of said permanent magnets of said rotor;

said auxiliary magnetic pole areas generate said reluctance torque by said magnetic flux generated by said stator windings;

said automobile further comprises magnet pole position detecting means for detecting a position of said permanent magnet of said rotor; and said control circuit generates magnetic flux to said stator winding by controlling a current flowing through said stator winding based on a position of said permanent magnet detected by said magnet pole position detecting means, generates said reluctance torque by said magnetic flux at said auxiliary magnetic pole areas, and controls an electric power supplied to said permanent magnet rotating electric machine by a field weakening control.

16. An automobile having a battery for supplying electric power, a permanent magnet rotating electric machine and a control circuit for controlling electric power supplied to said permanent magnet rotating electric machine, wherein said permanent magnet rotating electric machine comprises:

a stator having a plurality of stator cores on which three-phase windings are wound concentratively;

a rotor held rotatably inside said stator, and having a rotor core formed of a plurality of laminated silicon steel plates;

a plurality of circumferentially disposed holes provided at said rotor core;

a plurality of permanent magnets inserted in a plurality of holes provided at said rotor core so as to be changed a polarity at each pole alternative, and auxiliary magnetic pole areas provided between said permanent magnets of each pole; wherein, a rotational torque is generated based on a torque generated in response to a magnetic flux acting from said permanent magnets to said stator and a reluctance torque generated by said auxiliary magnetic pole areas;

said stator windings generate magnetic flux by receiving current that is controlled in response to a position of said permanent magnets of said rotor;

said auxiliary magnetic pole areas generate said reluctance torque by said magnetic flux generated by said stator windings;

said automobile further comprises magnet pole position detecting means for detecting a position of said permanent magnet of said rotor; and said control circuit generates magnetic flux to said stator winding by controlling a current flowing through said stator winding based on a position of said permanent magnet detected by said magnet pole position detecting means, generates a reluctance torque by said magnetic flux at said auxiliary magnetic pole areas, and controls an electric power supplied to said permanent magnet rotating electric machine by a field weakening control.

17. An automobile having a battery for supplying electric power, a permanent magnet rotating electric machine and a control circuit for controlling electric power supplied to said permanent magnet rotating electric machine, said electric machine comprising:

a stator having a plurality of stator cores on which three-phase windings are wound concentratively, and having a plurality of stator salient poles;

a rotor held rotatably inside said stator, and having a rotor core;

a plurality of permanent magnets arranged circumferentially about said rotor core, counter to said stator salient poles, with alternately opposite polarity in the circumferential direction; and auxiliary magnetic pole areas provided at said rotor core, between said permanent magnets of each pole; wherein, a rotational torque is generate based on a torque generated in response to a magnetic flux acting from said permanent magnets to said stator and a reluctance torque generated by said auxiliary magnetic pole areas;

said stator windings generate magnetic flux by receiving current that is controlled in response to a position of said permanent magnets of said rotor;

said auxiliary magnetic pole areas generate said reluctance torque by said magnetic flux generated by said stator windings;

the relationship M:P=6n:6n+2 or M:P=3n:3n±2 is satisfied, where M is the number of said stator salient poles, P is the number of said permanent magnets, and n is a positive integer;

said automobile further comprises magnet pole position detecting means for detecting a position of said permanent magnet of said rotor; and said control circuit generates magnetic flux to said stator winding by controlling a current flowing through said stator winding based on a position of said permanent magnet detected by said magnet pole position detecting means, generates said reluctance torque by said magnetic flux at said auxiliary magnetic pole areas, and controls an electric power supplied to said permanent magnet rotating electric machine by a field weakening control.

18. An automobile according to claim 17, wherein the number of the poles of said rotor having said permanent magnets is one of eight and ten.

19. An automobile having a battery for supplying electric power, a permanent magnet rotating electric machine driven by said electric power, and a control circuit for controlling electric power supplied to said permanent magnet rotating electric machine, wherein said permanent magnet rotating electric machine comprises:

a stator having a plurality of stator cores on which three-phase windings are wound concentratively:

a rotor held rotatably inside said stator, and having a rotor core formed of a plurality of laminated silicon steel plates;

a plurality of circumferentially disposed holes provided at said rotor core;

a plurality of permanent magnets inserted in said plurality of holes, counter to said stator salient poles and having alternating polarity at each respective pole relative to its neighbors; and auxiliary magnetic pole areas provided at areas between said permanent magnets of each pole; wherein, a rotational torque is generated based on a torque generated in response to a magnetic flux acting from said permanent magnets to said stator and a reluctance torque generated by said auxiliary magnetic pole areas;

said stator windings generate magnetic flux by receiving current that is controlled in response to a position of said permanent magnets of said rotor;

said auxiliary magnetic pole areas generate said reluctance torque by said magnetic flux generated by said stator windings; and the relationship M:P=6n:6n±2 or M:P=3n:3n±2 is satisfied, where M is the number of said stator salient poles, P is the number of said permanent magnets, and n is a positive integer;

said automobile further comprises magnet pole position detecting means for detecting a position of said permanent magnet of said rotor; and said control circuit generates magnetic flux to said stator winding by controlling a current flowing through said stator winding based on a position of said permanent magnet detected by said magnet pole position detecting means, generates a reluctance torque by said magnetic flux at said auxiliary magnetic pole areas, and controls an electric power supplied to said permanent magnet rotating electric machine by a field weakening control.

20. An automobile according to claim 19, wherein the number of the poles of said rotor having said permanent magnets is one of eight and ten.

21. An automobile having a power source for supplying electric power, a permanent magnet rotating electric machine driven by said electric power of said power source, and a control circuit for controlling electric power supplied to said permanent magnet rotating electric machine, wherein said permanent magnet rotating electric machine comprises:

a stator having a plurality of stator cores on which three-phase windings are wound concentratively;

a rotor held rotatably inside said stator, and having a rotor core formed of a plurality of laminated silicon steel plates;

a plurality of permanent magnets inserted in a plurality of holes arranged circumferentially about said rotor core, with alternately reversing polarity at each respective pole; and auxiliary magnetic pole areas provided between said permanent magnets of each neighboring pole of said rotor core; wherein, a rotational torque is generated based on a torque generated in response to a magnetic flux acting from said permanent magnets to said stator and a reluctance torque generated by said auxiliary magnetic pole areas;

said stator windings generate magnetic flux by receiving current that is controlled in response to a position of said permanent magnets of said rotor;

said auxiliary magnetic pole areas generate said reluctance torque by said magnetic flux generated by said stator windings;

further, same phase, windings are wound around a plurality of stator salient poles; and a winding wound on at least one of said plurality of stator salient poles on which same-phase winding are wound has a phase difference of voltage for the other same-phase winding; and the relationship M:P=6N:6n±2 or M:P=3n:3n±2 is satisfied, where M is the number of said stator salient poles, P is the number of said permanent magnets, and n is a positive integer; and said automobile further comprises magnet pole position detecting means for detecting a position of said permanent magnet of said rotor; and said control circuit generates magnetic flux to said stator winding by controlling a current flowing through said stator winding based on a position of said permanent magnet detected by said magnet pole position detecting means, generates a reluctance torque by said magnetic flux at said auxiliary magnetic pole areas, and controls an electric power supplied to said permanent magnet rotating electric machine by a field weakening control.

22. An automobile according to claim 21, wherein the number of the poles of said rotor having said permanent magnets is one of eight and ten.

23. An automobile having a battery for supplying an electric power, a permanent magnet rotating electric machine driven by said electric power, and a control circuit for controlling an electric power supplied to said permanent magnet rotating electric machine, wherein said permanent magnet rotating electric machine comprises:

a stator having a plurality of stator cores on which three-phase windings are wound concentratively;

a rotor held rotatably inside said stator, and having a rotor core formed of a plurality of laminated silicon steel plates;

a plurality of permanent magnets inserted in a plurality of holes that are arranged circumferentially about said rotor core, with each respective magnet having a polarity opposite that of circumferentially adjacent magnets; and auxiliary magnetic pole areas provided between said permanent magnets of each neighboring pole; wherein, magnetic pole piece areas are provided at said rotor core, radially outward of said permanent magnets;

a rotational torque is generated based on a torque generated in response to a magnetic flux acting from said permanent magnets to said stator via said magnetic pole piece areas and a reluctance torque generated by said auxiliary magnetic pole areas;

said stator windings generate magnetic flux by receiving current that is controlled in response to a position of said permanent magnets of said rotor;

said auxiliary magnetic pole areas generate said reluctance torque by said magnetic flux generated by said stator windings;

further, same phase windings, are wound around a plurality of stator salient poles;

a winding wound on at least one of said plurality of stator salient poles on which same-phase winding are wound has a phase difference of voltage for the other same-phase winding; and the relationship M:P=6N:6n±2 or M:P=3n:3n±2 is satisfied, where M is the number of said stator salient poles, P is the number of said permanent magnets, and n is a positive integer; and said automobile further comprises magnet pole position detecting means for detecting a position of said permanent magnet of said rotor; and said control circuit generates magnetic flux to said stator winding by controlling a current flowing through said stator winding based on a position of said permanent magnet detected by said magnet pole position detecting means, generates a reluctance torque by said magnetic flux at said auxiliary magnetic pole areas, and controls said permanent magnet rotating electric machine by a field weakening control at a high rotational speed of said permanent magnet rotating electric machine.

24. An automobile according to claim 23, wherein the number of the poles of said rotor having said permanent magnets is one of eight and ten.

25. A permanent magnet rotating electric machine according to claim 1, wherein:

said rotor receives current controlled by a weakening field control so that a current phase is advanced at a high rotational speed of said permanent magnet rotating electric machine compared with current phase at a low rotational speed, and generates magnetic flux by supplied current.

26. A permanent magnet rotating electric machine for a vehicle driven by electric power of a battery carried on the vehicle, said machine comprising:

a stator having a stator core on which stator windings are wound concentratively;

a rotor having a laminated rotor core, and held rotatably inside said stator;

a plurality of permanent magnets inserted in a plurality of holes provided in said rotor core, with alternately reversing polarity at each pole respectively;

magnetic pole piece areas provided at an outer periphery of said rotor core; and auxiliary magnetic pole areas provided at said rotor core between said permanent magnets of each pole, for generating a reluctance torque; wherein, said magnetic pole piece areas in said laminated rotor core ease pulsated magnetic flux acting from said stator to said permanent magnets;

said stator and rotor are configured to provide a rotational torque based on a torque generated in response to a magnetic flux acting from said permanent magnets to said stator via said magnetic pole piece areas and said reluctance torque generated by said auxiliary magnetic pole areas; and said stator receives current controlled by a weakening field control such that a current phase at a high rotational speed of said permanent magnet rotating electric machine is advanced compared with a current phase at a low rotational speed, and generates magnetic flux by supplied current.

27. A permanent magnet rotating electric machine for a vehicle driven by electric power of a battery carried on the vehicle, said machine comprising:

a stator having a plurality of stator cores on which multi-phase windings are wound concentratively;

a rotor held rotatably inside said stator, and having a rotor core formed of a plurality of laminated silicon steel plates;

a plurality of permanent magnets inserted in a plurality of holes arranged circumferentially about said rotor core, with a polarity at each respective pole being opposite that of circumferentially adjacent magnets;

magnetic pole piece areas provided at an outer periphery of said rotor core; and auxiliary magnetic pole areas provided at said rotor core, between said permanent magnets of each pole; wherein, a rotational torque is generated based on a torque generated in response to a magnetic flux acting from said permanent magnets to said stator via said magnetic pole piece areas and a reluctance torque generated by said auxiliary magnetic pole areas;

said stator receives current controlled by a weakening field control so that a current phase is advanced at a high rotational speed of said permanent magnet rotating electric machine compared with a current phase at a low rotational speed of that, and generates magnetic flux by supplied current;

said auxiliary magnetic pole areas generate said reluctance torque by a magnetic flux generated by said rotor windings;

further, same phase, windings are wound around a plurality of stator salient poles; and a winding wound on at least one of said plurality of stator salient poles for which same-phase winding are wound has a phase difference of voltage for the other same-phase winding.

28. A permanent magnet rotating electric machine for a vehicle driven by an electric power of a battery carried on the vehicle, said machine comprising:

a stator having a plurality of stator cores on which three-phase windings are wound concentratively;

a rotor held rotatably inside said stator, and having a rotor core formed of a plurality of laminated silicon steel plates;

a plurality of holes disposed circumferentially about said rotor core;

a plurality of permanent magnets inserted in said plurality of holes, with alternating polarity at each respective pole relative to its circumferential neighbors; and auxiliary magnetic pole areas provided between said permanent magnets of each pole; wherein, a rotational torque is generated based on a torque generated in response to a magnetic flux acting from said permanent magnets to said stator and a reluctance torque generated by said auxiliary magnetic pole areas;

said stator receives current controlled by a weakening field control so that a current phase is advanced at a high rotational speed of said permanent magnet rotating electric machine compared with a current phase at a low rotational speed of that, and generates magnetic flux by supplied current;

said auxiliary magnetic pole areas generate said reluctance torque by a magnetic flux generated by said stator windings;

further, same phase, windings are wound around a plurality of stator salient poles; and a winding wound on at least one of said plurality of stator salient poles for which same-phase winding are wound has a phase difference of voltage for the other same-phase winding.

29. A permanent magnet rotating electric machine for a vehicle driven by an electric power of a battery carried on the vehicle, said machine comprising:

a stator having a plurality of stator cores on which three-phase windings are wound concentratively, and having a plurality of stator salient poles;

a rotor held rotatably inside said stator, and having a rotor core;

a plurality of permanent magnets arranged circumferentially about said rotor core, counter to said stator salient poles, with alternately opposite polarity in the circumferential direction; and auxiliary magnetic pole areas provided at said rotor core, between said permanent magnets of each pole; wherein, a rotational torque is generate based on a torque generated in response to a magnetic flux acting from said permanent magnets to said stator and a reluctance torque generated by said auxiliary magnetic pole areas;

said stator receives current controlled by weakening field control so that a current phase is advanced at a high rotational speed of said permanent magnet rotating electric machine compared with current phase at a low rotational speed, and generates magnetic flux by supplied current;

said auxiliary magnetic pole areas generate said reluctance torque by magnetic flux generated by said stator windings; and the relationship M:P=6N:6n+2 or M:P=3n:3n±2 is satisfied, where M is the number of said stator salient poles, P is the number of said permanent magnets, and n is a positive integer.

30. A permanent magnet rotating electric machine according to claim 29, wherein the number of the poles of said rotor having said permanent magnets is one of eight and ten.

31. A permanent magnet rotating electric machine for a vehicle driven by electric power of a battery carried on a vehicle, said machine comprising:

a stator having a plurality of stator cores on which three-phase windings are wound concentratively, and having a plurality of stator salient poles;

a rotor held rotatably inside said stator, and having a rotor core formed of a plurality of laminated silicon steel plates;

a plurality of circumferentially disposed holes provided at said rotor core;

a plurality of permanent magnets inserted in said plurality of holes, counter to said stator salient poles and having alternating polarity at each respective pole relative to its neighbors; and auxiliary magnetic pole areas provided at areas between said permanent magnets of each pole; wherein, a rotational torque is generated based on a torque generated in response to a magnetic flux acting from said permanent magnets to said stator and a reluctance torque generated by said auxiliary magnetic pole areas;

said stator receives current controlled by weakening field control so that a current phase is advanced at a high rotational speed of said permanent magnet rotating electric machine compared with current phase at a low rotational speed, and generates magnetic flux by supplied current, said auxiliary magnetic pole areas generate said reluctance torque by a magnetic flux generated by said stator windings; and the relationship $M:P=6N:6n\pm2$ or $M:P=3n:3n\pm2$ is satisfied, where M is the number of said stator salient poles, P is the number of said permanent magnets, and n is a positive integer.

32. A permanent magnet rotating electric machine according to claim 31, wherein the number of the poles of said rotor having said permanent magnets is one of eight and ten.

33. A permanent magnet rotating electric machine for a vehicle driven by electric power of a power source carried on the vehicle, said machine comprising:

a stator having a plurality of stator cores on which three-phase windings are wound concentratively;

a rotor held rotatably inside said stator, and having a rotor core formed of a plurality of laminated silicon steel plates;

a plurality of permanent magnets inserted in a plurality of holes arranged circumferentially about said rotor core, with alternately reversing polarity at each respective pole; and auxiliary magnetic pole areas provided between said permanent magnets of each neighboring pole of said rotor core; wherein, a rotational torque is generated based on a torque generated in response to a magnetic flux acting from said permanent magnets to said stator and a reluctance torque generated by said auxiliary magnetic pole areas;

said stator receives current controlled by weakening field control so that a current phase is advanced at a high rotational speed of said permanent magnet rotating electric machine compared with current phase at a low rotational speed, and generates magnetic flux by supplied current;

said auxiliary magnetic pole areas generate said reluctance torque by a magnetic flux generated by said stator windings;

further, same phase, windings are wound around a plurality of stator salient poles;

a winding wound on at least one of said plurality of stator salient poles on which same-phase winding are wound has a phase difference of voltage for the other same-phase winding; and the relationship $M:P=6N:6n\pm2$ or $M:P=3n:3n\pm2$ is satisfied, where M is the number of said stator salient poles, P is the number of said permanent magnets, and n is a positive integer.

34. A permanent magnet rotating electric machine according to claim 33, wherein the number of the poles of said rotor having said permanent magnets is one of eight and ten.

35. A permanent magnet rotating electric machine for a vehicle driven by a battery carried on the vehicle, said machine comprising:

a stator having a plurality of stator cores on which three-phase windings are wound concentratively;

a rotor held rotatably inside said stator, and having a rotor core formed of a plurality of laminated silicon steel plates;

a plurality of permanent magnets inserted in a plurality of holes that are arranged circumferentially about said rotor core, with each respective magnet having a polarity opposite that of circumferentially adjacent magnets; and auxiliary magnetic pole areas provided between said permanent magnets of each neighboring pole; wherein, magnetic pole piece areas are provided at said rotor core, radially outward of said permanent magnets;

a rotational torque is generated based on a torque generated in response to a magnetic flux acting from said permanent magnets to said stator via said magnetic pole piece areas and a reluctance torque generated by said auxiliary magnetic pole areas;

said stator receives current controlled by weakening field control so that a current phase is advanced at a high rotational speed of said permanent magnet rotating electric machine compared with current phase at a low rotational speed, and generates magnetic flux by supplied current, said auxiliary magnetic pole areas generate said reluctance torque by a magnetic flux generated by said stator windings;

further, same phase, windings are wound around a plurality of stator salient poles;

a winding wound on at least one of said plurality of stator salient poles on which same-phase winding are wound has a phase difference of voltage for the other same-phase winding; and the relationship $M:P=6N:6n\pm2$ or $M:P=3n:3n\pm2$ is satisfied, where M is the number of said stator salient poles, P is the number of said permanent magnets, and n is a positive integer.

36. A permanent magnet rotating electric machine according to claim 35, wherein the number of the poles of said rotor having said permanent magnets is one of eight and ten.

37. An automobile having a DC power source, a permanent magnet rotating electric machine and a control circuit according to claim 13, wherein said control circuit controls said permanent magnet rotating electric machine by field weakening control, such that a current phase is advanced at high rotational speed of said permanent magnet rotating electric machine compared with current phase at a low rotational speed of said machine, and generates magnetic flux by supplied current.

38. The automobile according to claim 14, wherein said control circuit controls current supplying to said stator winding such that a current phase at a high rotational speed of said permanent magnet rotating electric machine is advanced compared with current phase at a low rotational speed of that, and generates magnetic flux by supplied current.

* * * * *

UNITED STATES PATENT AND TRADEMARK OFFICE
CERTIFICATE OF CORRECTION

PATENT NO. : 6,949,856 B2  Page 1 of 1
APPLICATION NO. : 10/800752
DATED : September 27, 2005
INVENTOR(S) : Fumio Tajima et al.

It is certified that error appears in the above-identified patent and that said Letters Patent is hereby corrected as shown below:

On the Title Page, Related U.S. Application Data should read,

Item (63) Continuation of application No. 10/142,154, filed May 10, 2002, now Pat. No. 6,734,592, which is a continuation of application No. 09/488,637, filed January 21, 2000, now Pat. No. 6,396,183, which is a continuation of application No. 08/838,745, filed April 11, 1997 now Pat. No. 6,034,460.

Signed and Sealed this

Twelfth Day of October, 2010

David J. Kappos
*Director of the United States Patent and Trademark Office*